US006917498B2

United States Patent
Kuwajima et al.

(10) Patent No.: US 6,917,498 B2
(45) Date of Patent: Jul. 12, 2005

(54) HEAD SUPPORT MECHANISM AND THIN FILM PIEZOELECTRIC ACTUATOR

(75) Inventors: Hideki Kuwajima, Kyoto (JP); Kaoru Matsuoka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/704,739

(22) Filed: Nov. 10, 2003

(65) Prior Publication Data

US 2004/0095663 A1 May 20, 2004

Related U.S. Application Data

(62) Division of application No. 09/774,347, filed on Jan. 31, 2001.

(30) Foreign Application Priority Data

| Feb. 1, 2000 | (JP) | 2000-024537 |
| Apr. 28, 2000 | (JP) | 2000-131746 |
| Oct. 20, 2000 | (JP) | 2000-322020 |

(51) Int. Cl.⁷ .................................................. G11B 5/592
(52) U.S. Cl. ................................................... 360/294.4
(58) Field of Search ........................................ 360/294.4

(56) References Cited

U.S. PATENT DOCUMENTS

| 5,243,482 A | 9/1993 | Yamaguchi et al. |
| 5,856,896 A | 1/1999 | Berg et al. |
| 5,898,544 A * | 4/1999 | Krinke et al. ............ 360/264.5 |
| 6,038,104 A | 3/2000 | Sato et al. |
| 6,046,884 A | 4/2000 | Crane |
| 6,061,208 A | 5/2000 | Hattori |
| 6,078,473 A | 6/2000 | Crane et al. |
| 6,118,637 A | 9/2000 | Wright et al. |
| 6,222,706 B1 * | 4/2001 | Stefansky et al. ........ 360/294.5 |
| 6,297,936 B1 | 10/2001 | Kant et al. |
| 6,327,120 B1 | 12/2001 | Koganezawa et al. |

FOREIGN PATENT DOCUMENTS

| EP | 591885 B1 | 1/1998 |
| JP | 3-097174 | 4/1991 |
| JP | 03-152775 | 6/1991 |
| JP | 5-47126 | 2/1993 |
| JP | 05-325274 | 12/1993 |
| JP | 6-150596 | 5/1994 |
| JP | 06-187624 | 7/1994 |
| JP | 07-300397 | 11/1995 |
| JP | 9-265738 | 10/1997 |
| JP | 10-134534 | 5/1998 |
| JP | 10-269732 | 10/1998 |
| JP | 10-293979 | 11/1998 |
| JP | 11-031368 | 2/1999 |
| WO | WO 98/19304 A1 | 5/1998 |
| WO | WO 98/27547 A | 6/1998 |
| WO | WO 98/44488 A1 | 10/1998 |
| WO | WO 99/01901 A1 | 1/1999 |

OTHER PUBLICATIONS

Chinese Office Action dated Jun. 27, 2003.

* cited by examiner

Primary Examiner—George J. Letscher
(74) Attorney, Agent, or Firm—RatnerPrestia

(57) ABSTRACT

A head support mechanism includes a slider for carrying a head at least for performing reproduction of data from a disk, and a holding portion for holding the slider. The holding portion includes: a first portion including a first piezoelectric element; a second portion including a second piezoelectric element; a third portion connected to the first and second portions, the slider being provided on the third portion; and a fixing portion for fixing the first and second portions. At least one of the first and second piezoelectric elements is contracted and expanded in a direction substantially parallel to a surface of the disk, in the presence of an applied voltage so that the slider provided on the third portion is rotated around a predetermined center of rotation.

8 Claims, 37 Drawing Sheets

X1–X1 Cross section

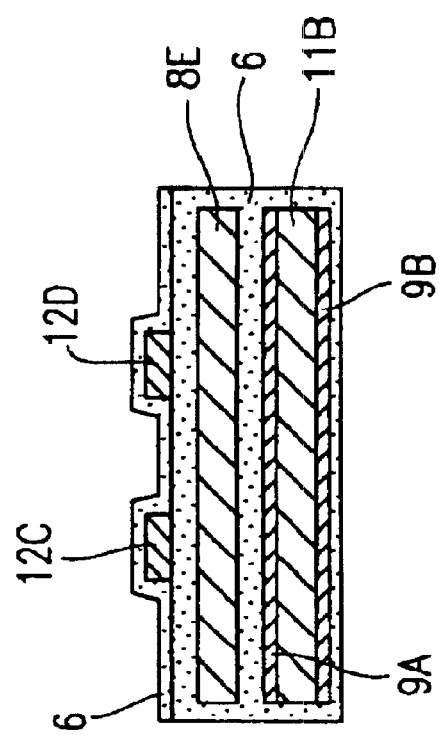
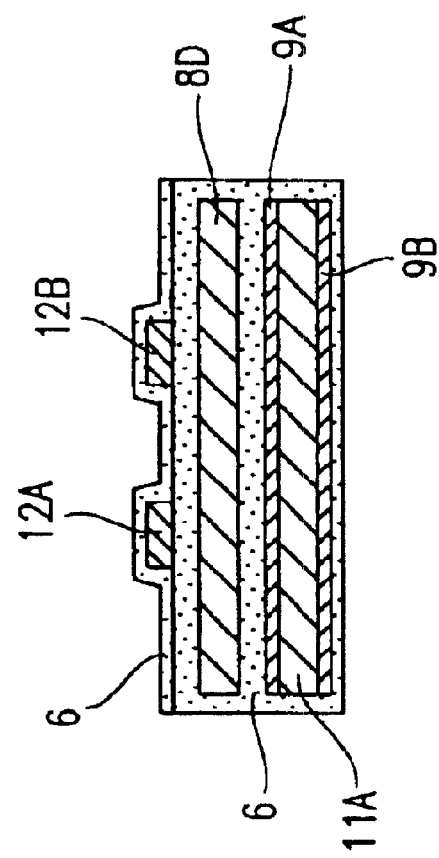
FIG.6

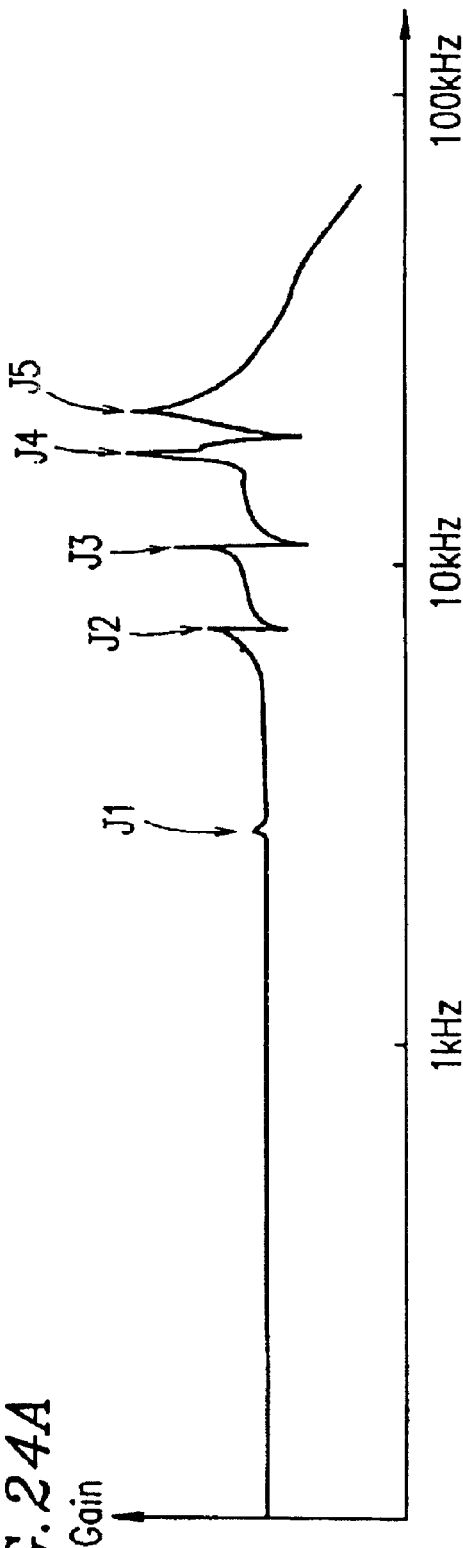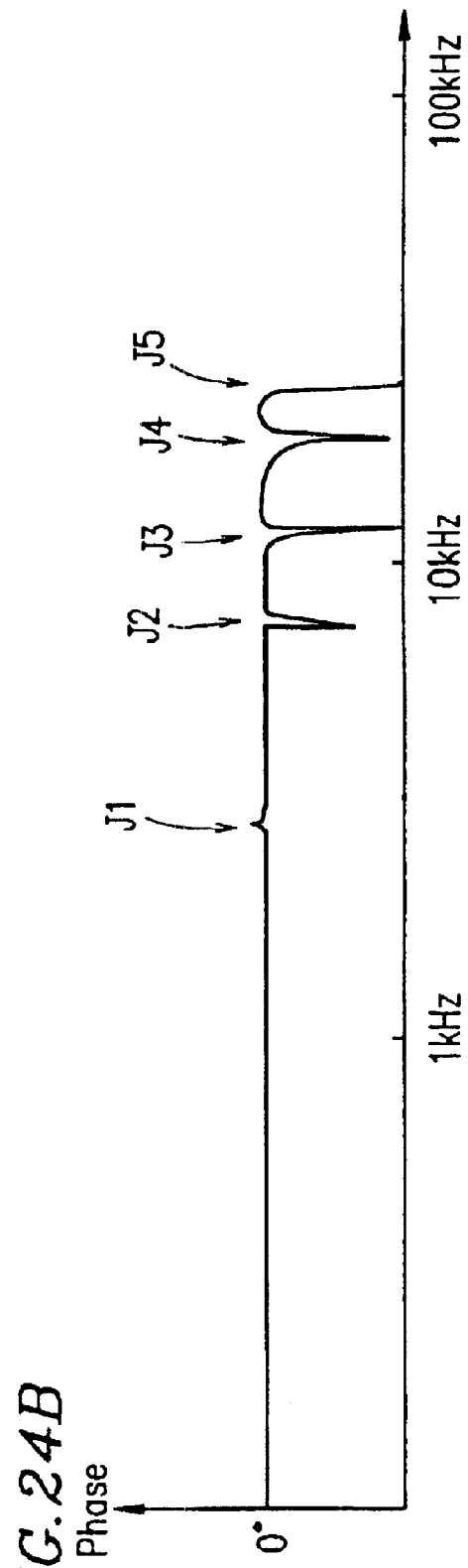
FIG. 24A Gain
FIG. 24B Phase

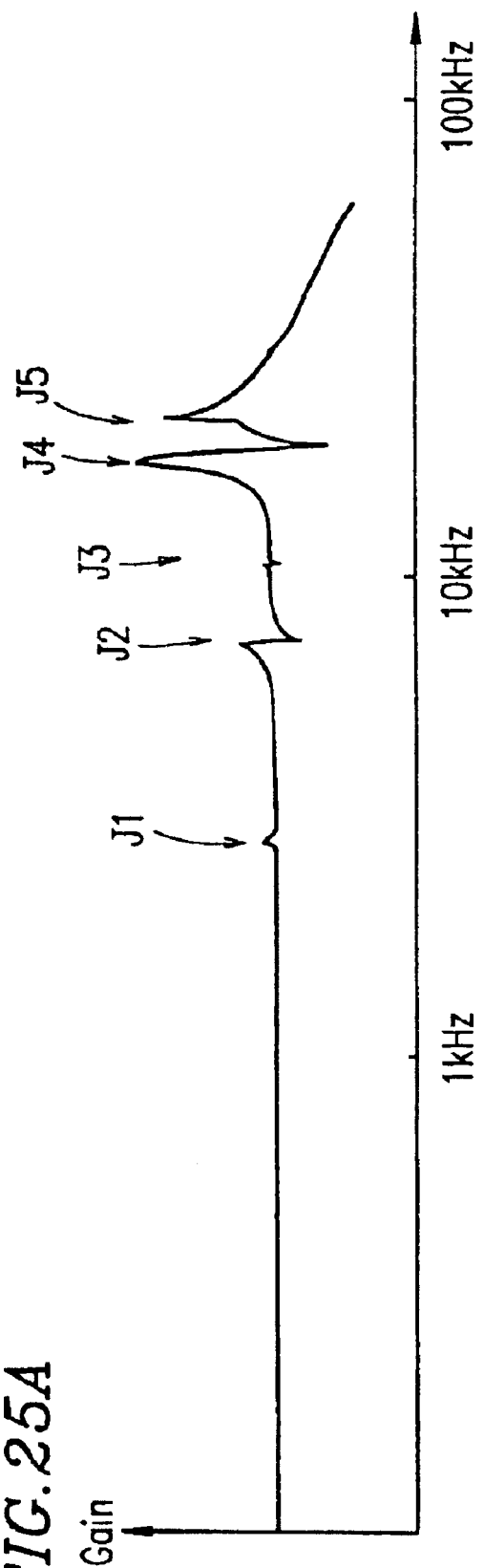
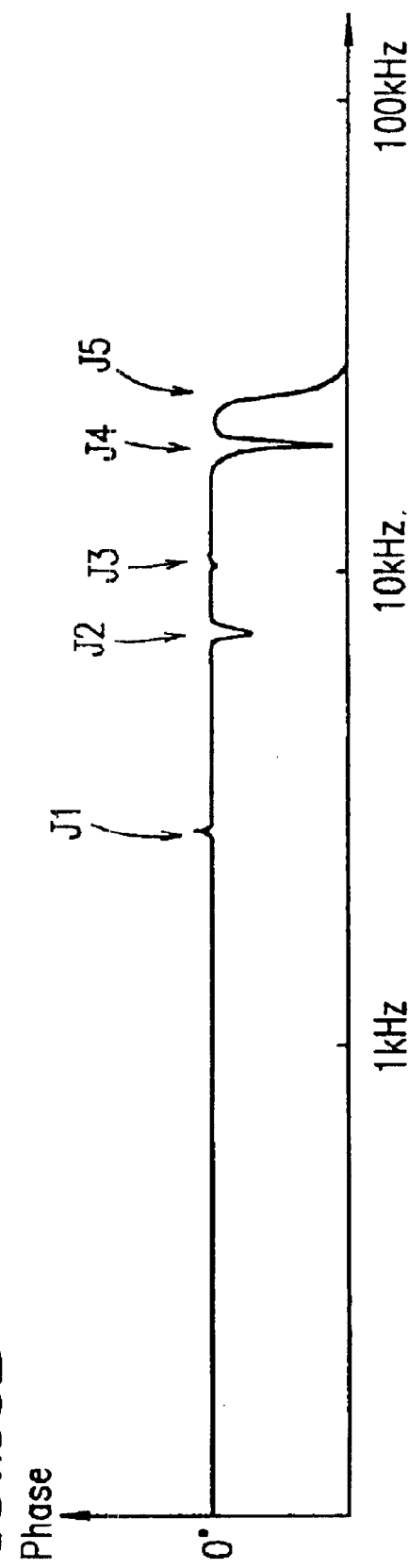
FIG. 25A
FIG. 25B

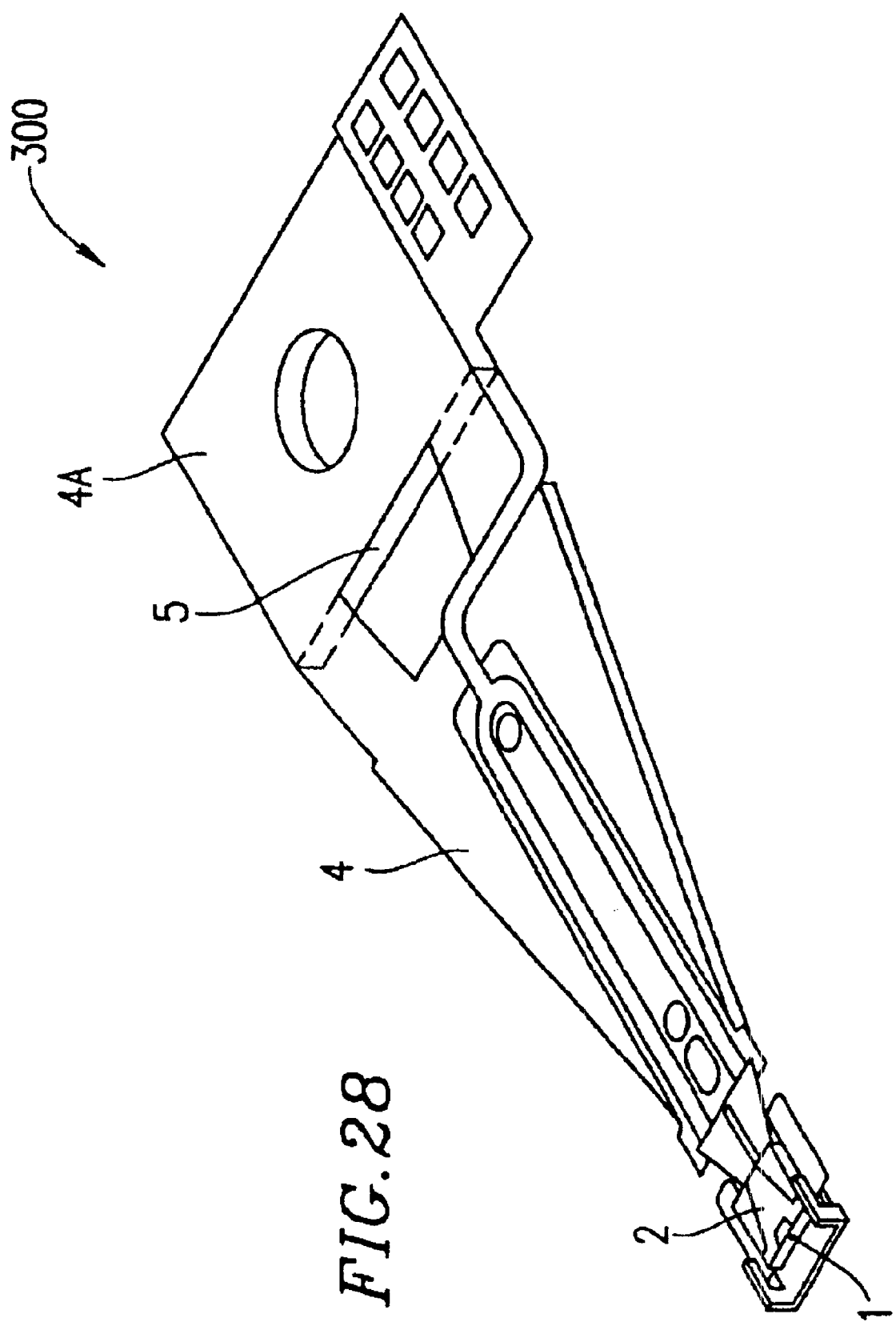

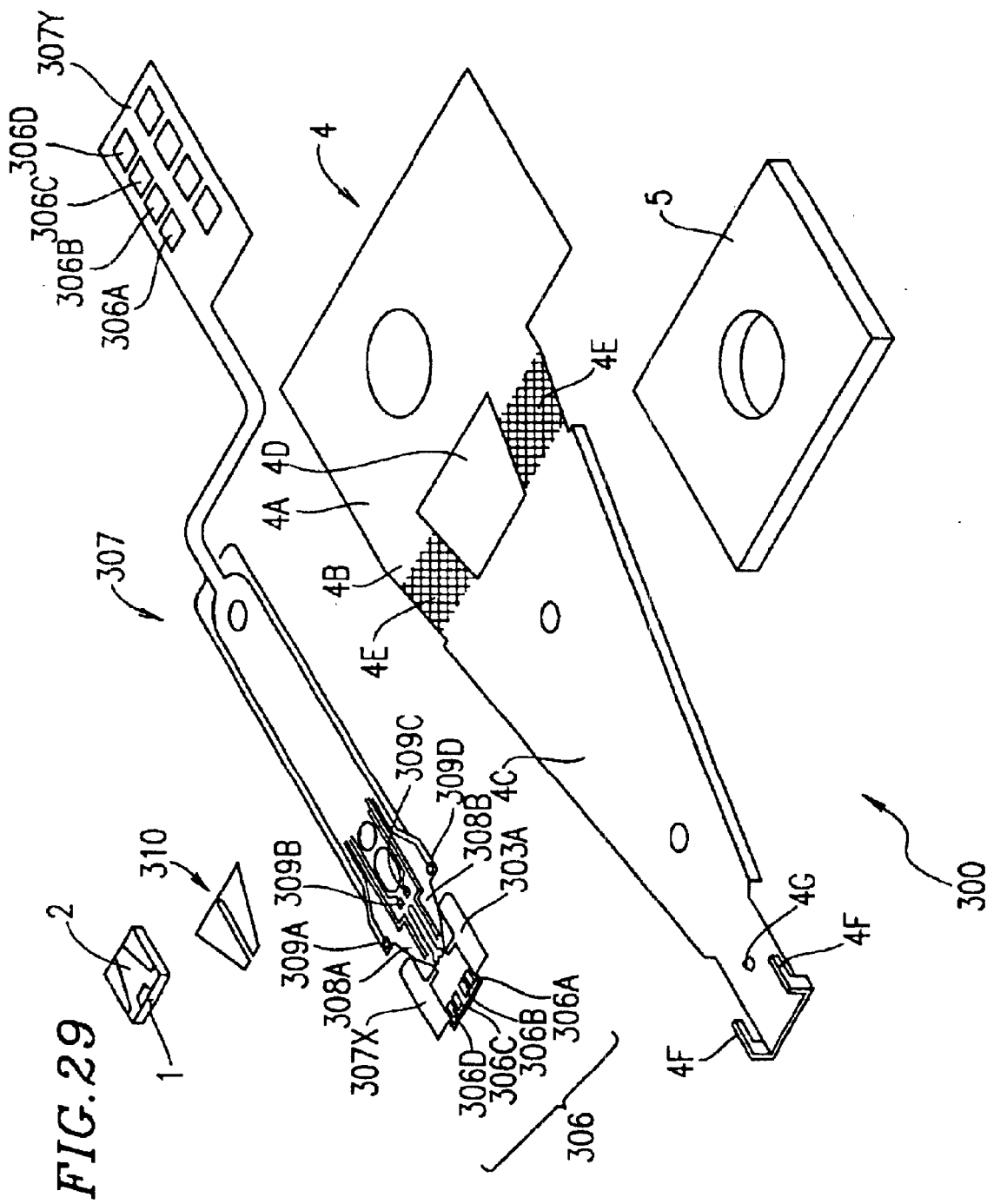

X1-X1 Cross section

X2-X2 Cross section

Voltage applied to thin film piezoelectric terminal 309A

Voltage applied to thin film piezoelectric terminal 309D

FIG.44A
FIG.44B
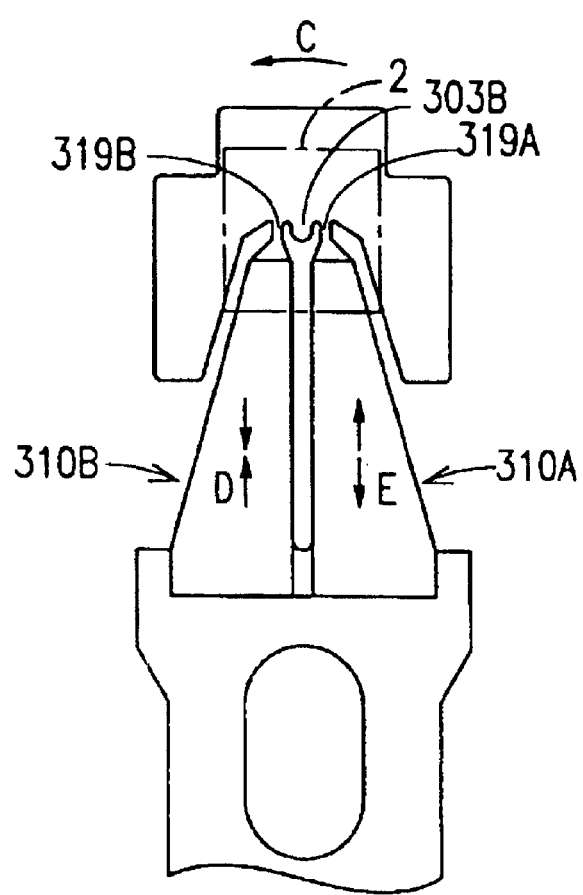
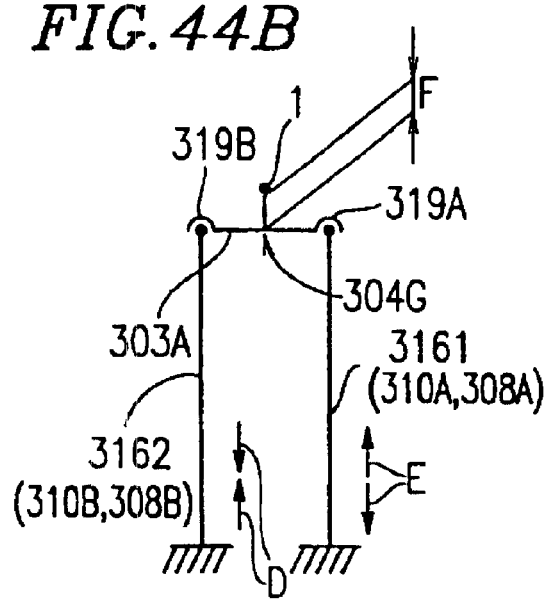

HEAD SUPPORT MECHANISM AND THIN FILM PIEZOELECTRIC ACTUATOR

This application is a divisional of U.S. patent application Ser. No. 09/774,347 filed Jan. 31, 2001. The entire disclosure of U.S. patent application Ser. No. 09/774,347 is expressly incorporated by reference herein.

BACKGROUND OF THE INVENTION

1. Field of the Invention

The present invention relates to a head support mechanism provided in a magnetic disk apparatus for use in a computer storage apparatus and the like. More particularly, the present invention relates to an optimal head support mechanism for high-density data recording, and a thin film piezoelectric actuator suitable for the head support mechanism.

2. Description of the Related Art

Recently, the recording density of a magnetic disk provided in a magnetic disk apparatus has been vigorously increased. A magnetic head for use in recording and reproducing data to and from a magnetic disk is typically provided on a slider. The slider carrying the magnetic head is supported on a head support mechanism provided in a magnetic disk apparatus. The head support mechanism has a head actuator arm to which the slider is attached. The head actuator arm it rotated by a voice coil motor (VCM). The head provided on the slider is placed at an arbitrary position on a magnetic disk by controlling the voice coil motor.

High-density data recording on a magnetic disk retires a high level of precise positioning of the magnetic head. In the case where the positioning of the magnetic head is performed by the VCH rotating the head actuator arm, there is a problem in that the positioning of the magnetic head is less precise. To avoid such a problem, a head support mechanism has already been proposed which achieves high-precision positioning of the magnetic head.

FIG. 45 is a top view illustrating a conventional head support mechanism 400 for use in a magnetic disk apparatus. A head 402 is used to record and reproduce data to and from a rotating magnetic disk (not shown). The head 402 is supported on an end portion of a suspension arm 404. The other end portion of the suspension arm 404 is supported on a projection portion 408 provided in the tip portion of a carriage 406 in such a manner as to rotate within a small angle range on the projection portion 400. A base portion of the carriage 406 is supported on an axis member 410 fixed to a housing of the magnetic disk apparatus in such a manner as to rotate on the axis member 410.

A permanent magnet (not shown) is fixed to the carriage 406. A drive coil 414 as a part of a magnetic circuit 412 fixed to the housing is controlled by an excitation current flowing therethrough. The carriage 406 is rotated on the axis member 410 by interaction of the permanent magnet and the drive coil 414. Thereby, the head 402 is moved in a substantially radial direction of a magnetic disk.

A pair of piezoelectric elements 416 are provided between the carriage 406 and the suspension arm 404. The longitudinal directions of the piezoelectric elements 416 are slightly deviated from the longitudinal direction of the carriage 406 in opposite directions. The suspension arm 404 is rotated within a small angular range on the projection portion 405 and along a surface of the carriage 406 by expansion or contraction along a direction indicated by arrow A14 of the piezoelectric elements 416. Thereby, the head 402 attached to the tip portion of the suspension arm 404 is moved along a surface of a magnetic disk within a small range so that the head 402 can be precisely placed at a desired position on the magnetic disk.

In the conventional head support mechanism 400 of FIG. 45, each piezoelectric element 416 is interposed between the suspension arm 404 and the carriage 406. Side portions in the longitudinal direction of each piezoelectric element 416 contact the suspension arm 404 and the carriage 406. Deformation of each piezoelectric element 416 causes the suspension arm 404 to be rotated So that the head 402 is slightly displaced. In other words, a voltage is applied to each piezoelectric element 416 to cause the rotation of the suspension arm 404, resulting in a small displacement of the head 402. However, the head 402 does not always follow the voltage applied to each piezoelectric element 416 with great precision. It is thus unlikely that the head 402 is precisely placed at a desired position.

SUMMARY OF THE INVENTION

According to one aspect of the present invention, a head support mechanism includes: a slider for carrying a head at least for performing reproduction of data from a disk; and a holding portion for holding the slider. The holding portion includes a first portion including a first piezoelectric element a second portion including a second piezoelectric element; a third portion connected to the first and second portions, the slider being provided on the third portion; and a fixing portion for fixing the first and second portions. At least one of the first and second piezoelectric elements is contracted and expanded in a direction substantially parallel to a surface of the disk, in the presence of an applied voltage so that the slider provided on the third portion is rotated around a predetermined center of rotation.

In one embodiment of this invention, the head support mechanism further includes a load beam provided at a side of the holding portion opposite to the slider. The load beam includes a dimple projecting toward the slider in such a manner as to apply a load to the slider. The holding portion further includes a first joining portion for joining the first and third portions, and a second joining portion for joining the second and third portions. The dimple is provided at a substantially middle point between the first and second joining portions.

In one embodiment of this invention, the first and second joining portions include first and second elastic hinges, respectively, each having a width sufficient to reduce a load required for rotation of the slider.

In one embodiment of this invention, the first and second portions include first and second conductor patterns provided along the first and second elastic hinges, respectively. The first and second elastic hinges each have a minimum width required for providing the first and second conductor patterns, respectively.

In one embodiment of this invention, the head support mechanism further includes: a load beam provided at a side of the holding portion opposite to the Glider; and a slider holding plate provided between the third portion included in the holding portion and the load beam. The load beam includes a dimple projecting toward the slider in such a manner as to press the third portion via the slider holding plate. The slider holding plate has such a shape that the center of gravity of a combination of the slider holding plate and the slider substantially corresponds to the predetermined center of rotation.

In one embodiment of this invention, the load bean includes a regulation portion for regulating the slider holding plate.

In one embodiment of this invention, the dimple contacts a point of the slider holding plate to support the slider holding plate pressing the third portion in such a manner that the third portion can be rotated in all directions including a pitch direction, a roll direction, and a yaw direction.

In one embodiment of this invention, the head support mechanism further includes: a load beam provided at a side of the holding portion opposite to the slider; and a slider holding plate provided between the third portion included in the holding portion and the load beam. The load beam includes a dimple projecting toward the slider in such a manner as to press the third portion via the slider holding plate. The slider provided on the third portion is rotated on the dimple acting as the predetermined center of rotation.

In one embodiment of this invention, the second portion is provided in such a manner that a distance between the second portion and the surface of the disk is substantially equal to a distance between the first portion and the surface of the disk.

In one embodiment of this invention, the first portion includes a first electrode for applying a voltage to the first piezoelectric element; and the second portion includes a second electrode for applying a voltage to the second piezoelectric element.

In one embodiment of this invention, the first portion includes a first substrate. The second portion includes a second substrate. The first and second substrates are provided along a tangential direction of the disk. At least one of the first and second piezoelectric elements is contracted and expanded in a direction substantially parallel to the surface of the disk in such a manner that at least one of the first and second substrates is bent in a direction nearing or leaving the disk, so that the slider carrying the head is rotated by a small amount in a yaw direction.

In one embodiment of this invention, at least one of the first and second piezoelectric element is contracted and expanded in a direction substantially parallel to the surface of the disk in such a manner that only one of the first and second substrates is bent in a direction nearing or leaving the disk, so that the slider carrying the head is rotated by a small amount in a yaw direction.

In one embodiment of this invention, the first and second portions further include first and second flexible materials covering the first and second piezoelectric elements and the first and second substrates, respectively.

In one embodiment of this invention, the slider has an air bearing surface on which an appropriate air flow is generated between the slider and the rotating disk. The third portion is arranged so that a center position of the air bearing surface substantially corresponds to the predetermined center of rotation.

According to another aspect of the present invention, a head support mechanism includes; a slider for carrying a head at least for performing reproduction of data from a disk; and a holding portion for holding the slider. The holding portion includes a first portion including a first piezoelectric element; a second portion including a second piezoelectric element; and a fixing portion for fixing the first and second portion. At least one of the first and second piezoelectric elements is contracted and expanded in a direction substantially parallel to a surface of the disk, in the presence of an applied voltage so that the slider is rotated around a predetermined center of rotation. The head support mechanism further includes: a load beam provided at a side of the holding portion opposite to the slider; and a slider holding plate provided between the holding portion and the load beam and provided at a position corresponding to the slider. The load beam includes a dimple projecting toward the slider in such a manner as to press the third portion via the slider holding plate. The slider holding plate has such a shape that the center of gravity of a combination of the slider holding plate and the slider substantially corresponds to the predetermined center of rotation.

In one embodiment of this invention, the holding portion further includes a third portion, the slider being provided on the third portion. At least one of the first and second piezoelectric elements is contracted and expanded in a direction substantially parallel to the surface of the disk, in the presence of applied voltage so that the third portion is rotated around the predetermined center of rotation.

In one embodiment of this invention, the holding portion includes a first joining portion for joining the first and third portions, and a second joining portion for joining the second and third portions. The dimple is provided at a substantially middle point between the first and second joining portions.

In one embodiment of this invention, the slider is rotated on the dimple corresponding to the predetermined center of rotation.

In one embodiment of this invention, the second portion is provided in such a manner that a distance between the second portion and the surface of the disk is substantially equal to a distance between the first portion and the surface of the disk.

According to still another aspect of the present invention, a method for producing a thin film piezoelectric element, includes the steps of: a) forming a first metal electrode film, a first thin film piezoelectric element, and a second metal electrode film on a first substrate in this order; b) forming a third metal electrode film, a second thin film piezoelectric element, and a fourth metal electrode film on a around substrate in this order; c) attaching the second metal electrode film to the fourth metal electrode film; d) removing the first substrate by etching; e) shaping the first metal electrode film, the first thin film piezoelectric element, the second metal electrode film, the fourth metal electrode film, the second thin film piezoelectric element, and the third metal electrode film: f) covering the first metal electrode film, the first thin film piezoelectric element, the second metal electrode film, the fourth metal electrode film, the second thin film piezoelectric element, and the third metal electrode film, with a coating resin: and g) removing the second substrate by etching.

In one embodiment of this invention, the first and second substrates are each a mono-crystal substrate.

In one embodiment of this invention, the linear expansion coefficient of the first substrate is greater than the linear expansion coefficient of the first thin film piezoelectric element. The linear expansion coefficient of the second substrate is greater than the linear expansion coefficient of the second thin film piezoelectric element.

In one embodiment of this invention, step c) includes attaching the second metal electrode film to the fourth metal electrode film using a conductive adhesive.

In one embodiment of this invention, step c) includes attaching the second metal electrode film to the fourth metal electrode film using a thermal melting technique using ultrasonic vibration.

In one embodiment of this invention, step a) includes forming the first thin film piezoelectric element in such a manner that a polarization direction of the first thin film piezoelectric element substantially corresponds to a direction perpendicular to a surface of the first thin film piezoelectric element. Step b) includes forming the second thin film piezoelectric element in such a manner that a polarization direction of the second thin film piezoelectric element substantially corresponds to a direction perpendicular to a surface of the second thin film piezoelectric element.

According to still another aspect of the present invention, a thin film piezoelectric device includes: a first metal electrode film; a first thin film piezoelectric element provided on the first metal electrode film; a second metal electrode film provided on the first thin film piezoelectric element; a third metal electrode film; a second thin film piezoelectric element provided on the third metal electrode film a fourth metal electrode film provided on the second thin film piezoelectric element; and adhesive means for attaching the second metal electrode film to the fourth metal electrode film.

In one embodiment of this invention, the thin film piezoelectric device further includes voltage applying means for applying a voltage to the thin film piezoelectric device. The voltage applying means includes: a first terminal for applying a driving voltage to the first and third metal electrode films, and a second terminal for grounding the second and fourth metal electrode films.

According to still another aspect of the present invention, a head support mechanism includes: a slider for carrying a head; and a holding portion for holding the slider. The holding portion includes: a first portion including a first piezoelectric element; a second portion including a second piezoelectric element; a third portion connected to the first and second portions, the slider being provided on the third portion; and a fixing portion for fixing the first and second portions. The first and second piezoelectric elements include the above-described thin film piezoelectric device.

Thus, the invention described herein makes possible the advantages of providing: (1) a head support mechanism for use in a disk apparatus, which enables a head to move by a small displacement with great precision for the purposes of tracking correction and the like for a magnetic disk and the like; (2) a head support mechanism for use in a disk apparatus, which enables a head to move by a small displacement with great precision by control of a voltage; and (3) a thin film piezoelectric actuator preferably used for such head support mechanisms.

These and other advantages of the present invention will become apparent to those skilled in the art upon reading and understanding the following detailed description with reference to the accompanying figures.

BRIEF DESCRIPTION OF THE DRAWINGS

FIG. 6 is a cross-sectional view of FIG. 2 taken along line X—X.

FIGS. 24A and 24B are graphs showing response characteristics of the head support mechanism of FIGS. 21A and 21B.

FIGS. 25A and 23B are graphs showing response characteristics of the head support mechanism of FIGS. 22A and 22B.

FIG. 28 is a perspective view illustrating a head support mechanism according to Example 3 of the present invention.

FIG. 29 is an exploded, perspective view illustrating the head support mechanism of Example 3.

FIGS. 36A through 38C are diagram showing a procedure for forming the thin film piezoelectric element of Example 3 and electrodes thereof on a mono-crystal substrate.

FIGS. 44A and 44B are top views illustrating a schematic structure of the head support mechanism of Example 3, used for explaining operation thereof.

DESCRIPTION OF THE PREFERRED EMBODIMENTS

Hereinafter, the present invention will be described by way of illustrative examples with reference to the accompanying drawings.

EXAMPLE 1

Figure 1:
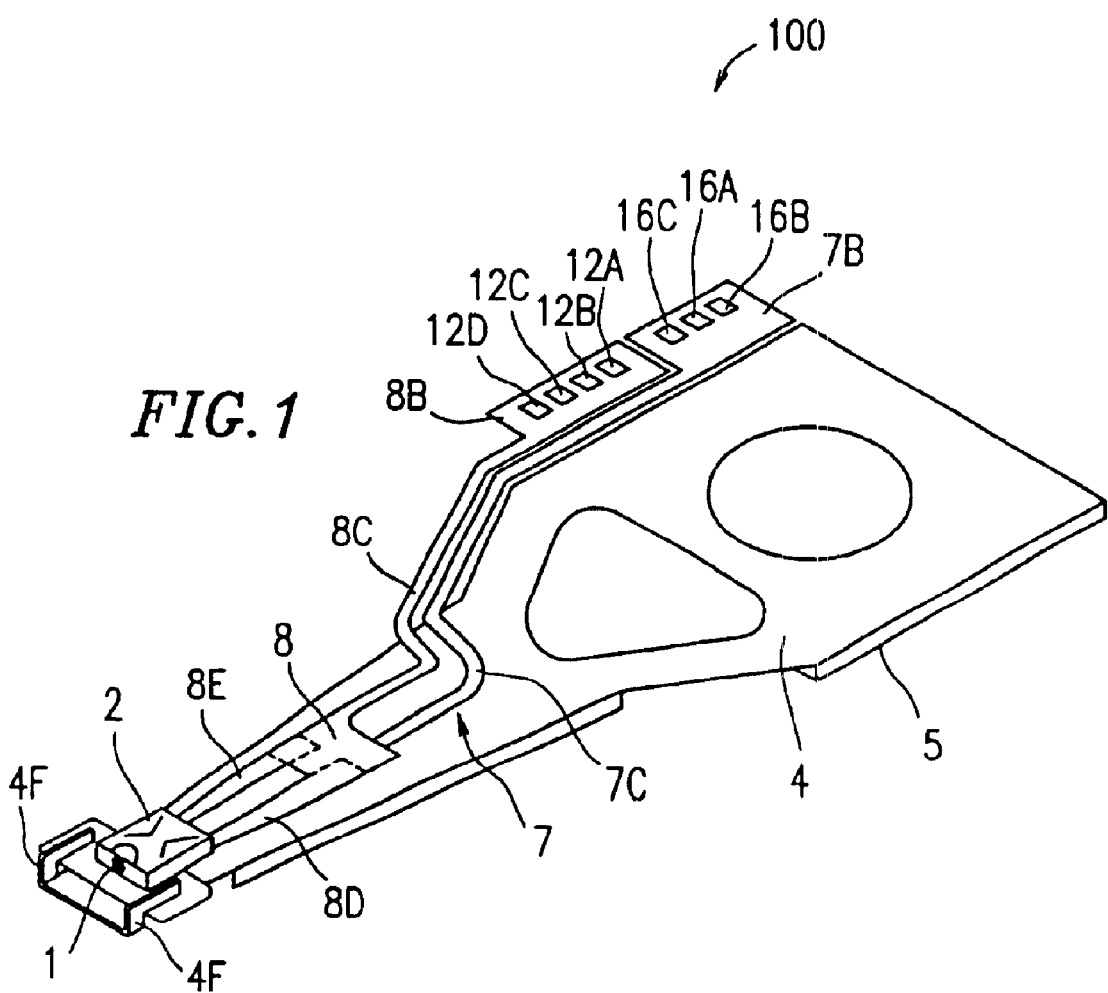
FIG. 1 is a perspective view illustrating a head support mechanism according to Example 1 of the present invention.
Figure 2:
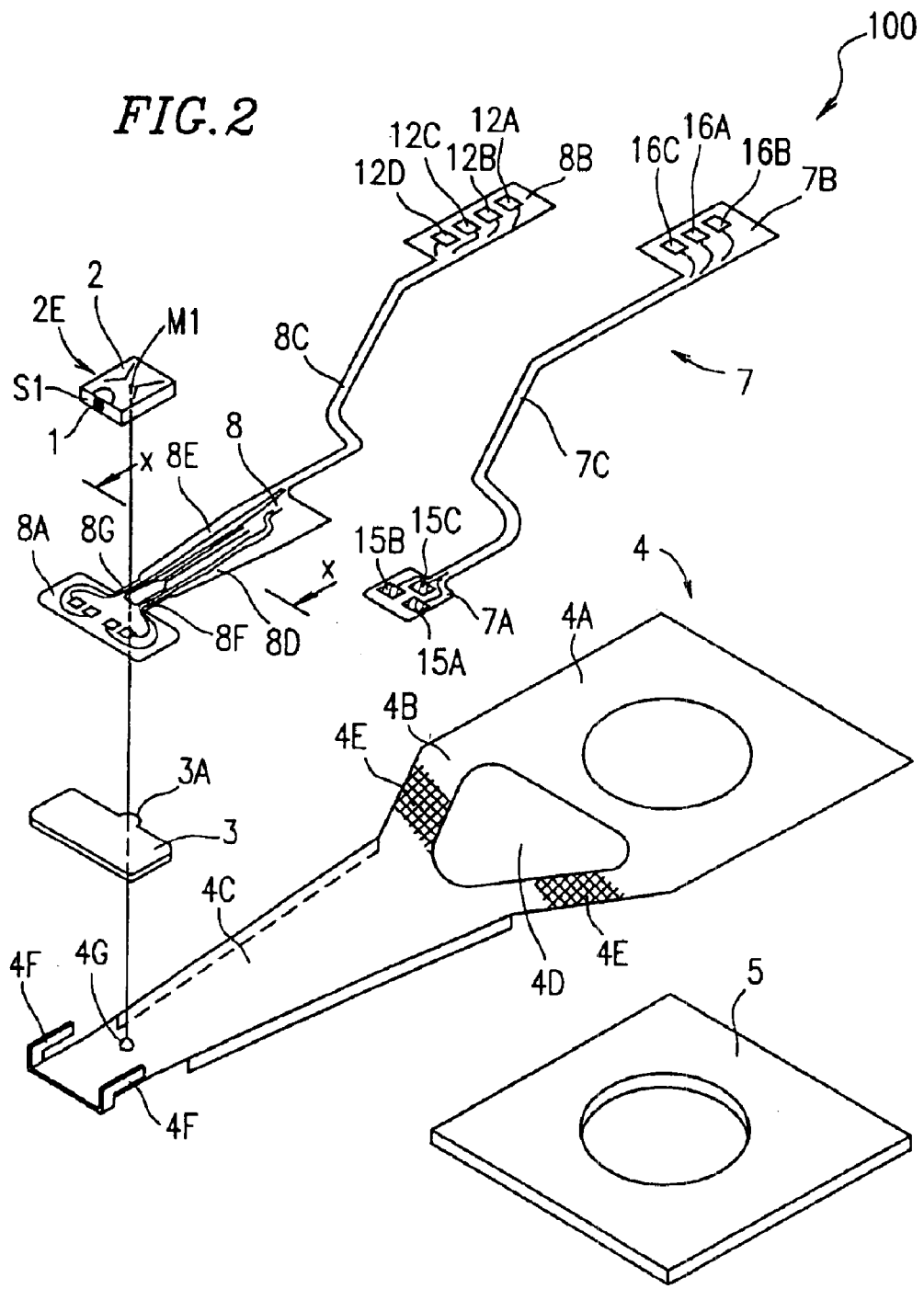
FIG. 2 is an exploded, perspective view illustrating the head support mechanism of Example 1.

FIG. 1 is a perspective view illustrating a head support mechanism 100 for use in a disk apparatus according to Example 1 of the present invention, viewed from a disk side. FIG. 2 is an exploded, perspective view illustrating the head support mechanism 100.

Referring to FIGS. 1 and 2, the head support mechanism 100 has a load beam 4, on a tip portion of which a slider 2 having an attached head 1 is supported. The load beam 4 includes a base portion 4A which is fixed by beam welding to a base plate 5 attached to a head actuator arm. The base portion 4A and the base plate 5 each have a similar square shape. The load beam 4 includes a neck portion 4B tapering from the base portion 4A, and a beam portion 4C extending straight from the neck portion 4B. An opening portion 4D is provided in the middle of the neck portion 4B. In the neck portion 4B, portions on the opposite sides of the opening portion 4D each function as a plate spring portion 4E.

A slider holding plate 3 is provided on the tip portion of the beam portion 4C of the load beam 4 in such a manner as to rotate.

The slider holding plate 3 is provided with a projection portion 3A which projects toward the base portion 4A of the load beam 4. In the tip portion of the beam portion 4C, a dimple 4G is provided which contacts and presses the projection portion 3A. The slider holding plate 3 is placed on the tip portion of the beam portion 4C and is engaged with each regulation portion 4F in such a manner that the projection portion 3A is pressed and held by the dimple 4G. Therefore, the slider holding plate 3A can be rotated on the dimple 4G in all directions.

The regulation portion 4F is provided on each side edge of the tip portion of the beam portion 4C. The regulation portions 4F are engaged with the respective side edges of the slider holding plate 3 so that rotation of the slider holding plate 3 can be regulated. Each regulation portion 4F extends straight from the tip portion of the beam portion 4C toward the base portion 4A. The side edges of the slider holding plate 3 are engaged with and regulated by the respective regulation portions 4F.

A thin film piezoelectric drive conductor pattern 7 and a thin film piezoelectric substrate 8 are provided on the beam portion 4C of the load beam 4. The thin film piezoelectric substrate 8 is made of a conductive and rigid material, such as stainless steel or copper. One end portion of the thin film piezoelectric drive conductor pattern 7 is a thin film piezoelectric terminal holding portion 7A which is positioned around the middle of the beam portion 4C. The thin film piezoelectric terminal holding portion 7A is partially overlapped with a part of thin film piezoelectric substrate 8. One end portion of the thin film piezoelectric substrate 8 is a slider attachment portion 8A which is provided on the slider holding plate 3. Further, the slider 2 carrying the head 1 is provided on the slider attachment portion 8A.

Figure 3:
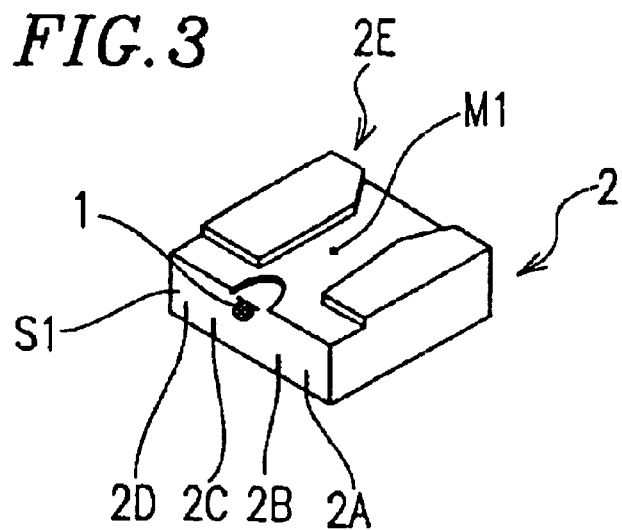
FIG. 3 is a perspective view illustrating a slider for use in the head support mechanism of Example 1.

The slider 2 is in the form of a rectangular parallelepiped as shown in FIG. 3. The head 1 including an MR (Magneto-Resistive) element is provided at the middle of an upper portion of a side S1 at the beam portion 4C tip portion side of the slider 2. The slider 2 is placed in such a manner that the head 1 is oriented toward a tangential line of a magnetic head. Further, four terminals 2A through 2D are disposed in a transverse direction in a lower portion of the side S1 of the slider 2. Further, an air bearing surface 2E is provided on an upper side of the slider 2. An air flow generated by a rotating magnetic disk is passed in a pitch direction of the slider 2 (a tangential direction of a magnetic disk) so that an air lubricating film is generated between the air bearing surface 2E and a magnetic disk.

As shown in FIGS. 2 and 3, a center position M1 of the air bearing surface 2E substantially corresponds to the projection portion 3A of the slider holding plate 3 supported an the dimple 4G, The slider 2 is supported on the slider attachment portion 8A in such a manner that the side S1 of the slider a faces the tip portion of the beam portion 4C of the load beam 4.

The slider holding plate 3 is held by the dimple 4G provided in the tip portion or the load beam 4 in such a manner that the slider holding plate 3 can be rotated on the projection portion 3A by a small displacement in all directions. Therefore, the slider 2 having its center position M1 on the projection portion 3A can be rotated on the projection portion 3A by a small displacement in all directions.

As shown in FIGS. 1 and 2, the other end portion of the thin film piezoelectric drive conductor pattern 7 is an external connection terminal holding portion 7B which is provided on an edge portion of the base portion 4A of the load beam 4. Three terminal portions 15A, 15B, and 15C are provided on the thin film piezoelectric terminal holding portion 7A, and connected to respective external connection terminal portions 16A, 16B, and 16C which are provided on the external connection terminal holding portion 7B.

A terminal holding portion 8B is provided on an edge portion opposed to the edge of the thin film piezoelectric substrate 8 on which the slider attachment portion 8A is provided. The terminal holding portion of is positioned at an edge of the base portion 4A of the load beam 4, and at the neck portion 4b side with respect to the external connection terminal holding portion 7B.

Figure 4:
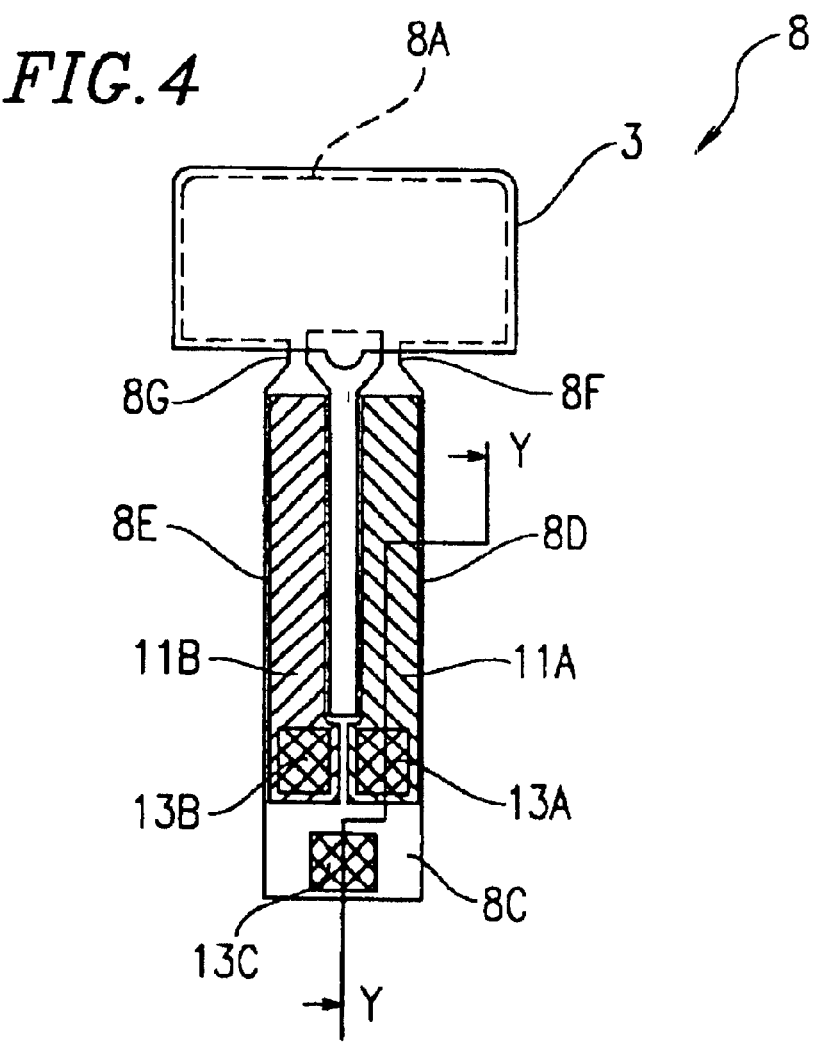
FIG. 4 is a bottom view of a major part of a thin film piezoelectric element substrate for use in the head support mechanism of Example 1.
Figure 5:
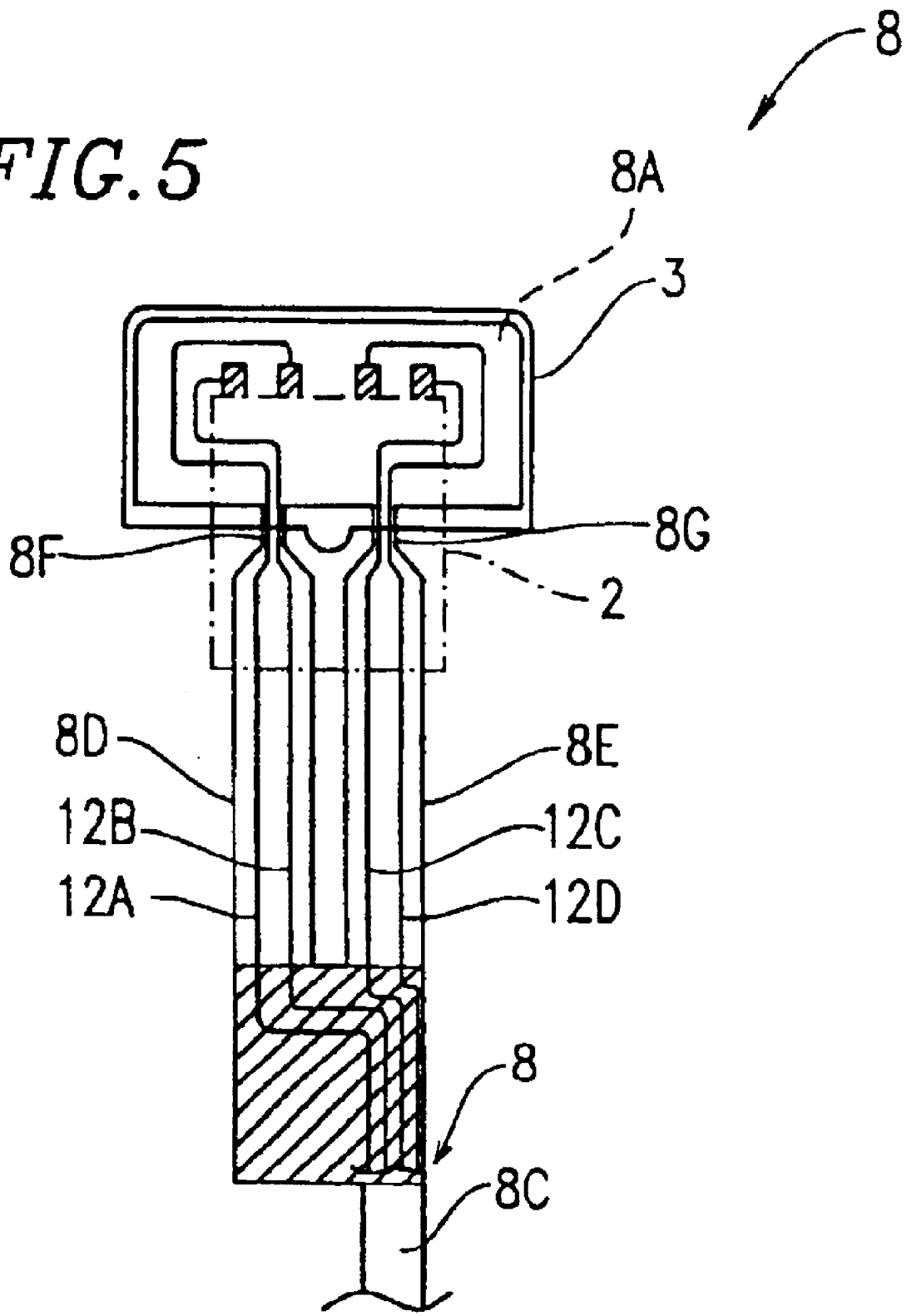
FIG. 5 is a top view illustrating a major part of the thin film piezoelectric element substrate of Example 1.

FIGS. 4 and 5 are a bottom view and a top view, respectively, illustrating the slider attachment portion 8A and the vicinity thereof, of the thin film piezoelectric substrate 8.

As shown in FIGS. 1 and 4, a pair of first and second conductor substrate portions 8D and 8E contiguous to the slider attachment portion 8A are provided on the thin film piezoelectric substrate 8. The conductor substrate portions 8D and 8E extend straight from the slider attachment portion 8A and are disposed a distance from each other and in parallel.

Elastic hinge portions 8F and 8G each having a narrow width are provided between the slider attachment portion 8A and conductor substrate portions 8D and 8E of the thin film piezoelectric substrate 8, respectively. The elastic hinge portions 8F and 8G are elastically bent in the same plane as the slider attachment portion 8A.

The thin film piezoelectric substrate 8 and the thin film piezoelectric drive conductor pattern 7 may be integrated together.

Figure 7:
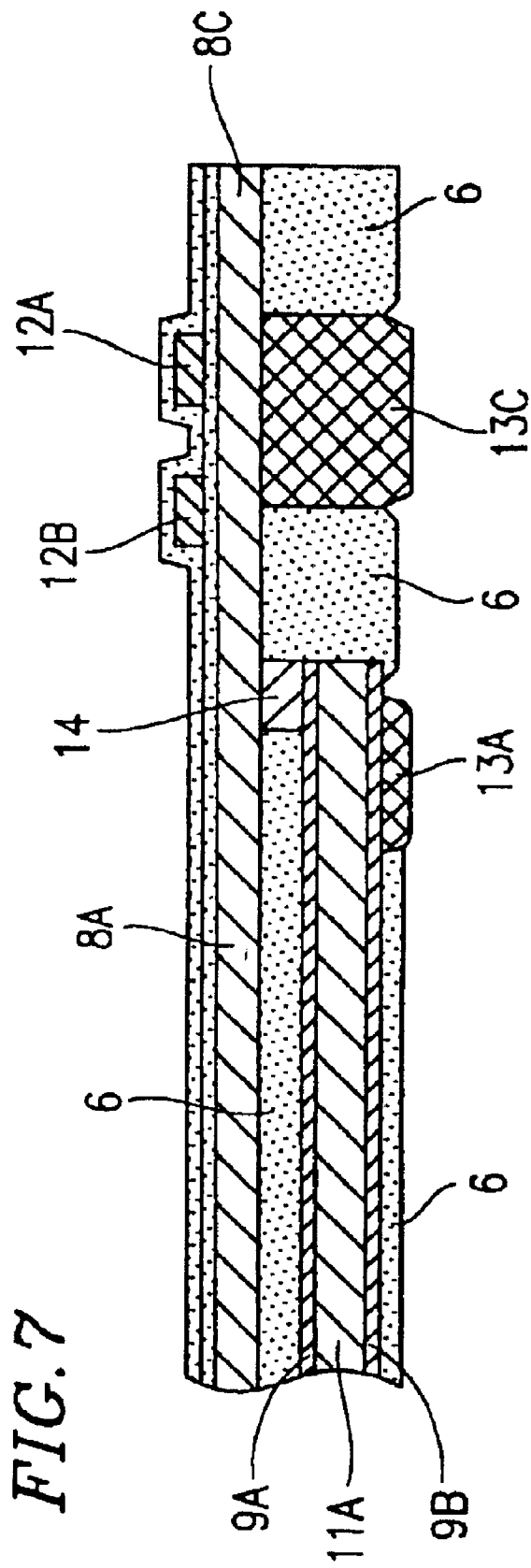
FIG. 7 is a cross-sectional view of FIG. 4 taken along line Y—Y.

FIG. 6 is a cross-sectional view of the thin film piezoelectric substrate 8 taken along line X—X shown in FIG. 2. FIG. 7 is a cross-sectional view of the thin film piezoelectric substrate 8 taken along line Y—Y shown in FIG. 4.

As shown in FIGS. 5 and 6, the first and second conductor substrate portions 8D and 8E are covered with a flexible material 6 made of a polymer such as polyimide. On upper surfaces of the conductor substrate portions 8D and 8B, a pair of conductor patterns 12A and 12D and a pair of conductor patterns 12C and 12D are provided, extending along the conductor substrate portions 8D and 8E, respectively. The conductor patterns 12A and 12B are attached by the flexible material 6 to the conductor substrate portion 8D. The conductor patterns 12C and 12D are attached to the conductor substrate portion 8E by the flexible material 6.

As shown in FIGS. 2 and 5, one and of the conductor patterns 12A, 12B, 12C and 12D are terminals which are provided on the slider attachment portion 8A. Further, the conductor patterns 12A, 12B, 12C and 12D are laid on a conductor portion 8C of the thin film piezoelectric substrate 8. The other ends of the conductor patterns 12A, 12B, 12C and 12D are terminals which are provided on the terminal holding portion 8B. Each conductor pattern 12A through 12D is covered with the flexible material 6.

As shown in FIG. 5, on an end portion (hatched portion in FIG. 5) opposed to the slider attachment portion 8A of the conductor substrate portions 8D and 8E, a fixing member (not shown) is provided which contacts and fixes the thin film piezoelectric drive conductor patterns 15A, 15B and 15C (FIG. 2) with terminals 13A, 13B and 13C (FIG. 4).

As shown in FIG. 6, first and second thin film piezoelectric elements 11A and 11B are provided under the first and second conductor substrate portions 8D and 8E, respectively. An upper side electrode 9A and a lower side electrode 9B made of platinum are provided on an upper side and a lower side of the first thin film piezoelectric element 11A, respectively. Similarly, an upper side electrode 9A and a lower side electrode 9B made of platinum are provided on an upper side and a lower side of the second thin film piezoelectric element 11B, respectively.

As shown in FIG. 7 a short member 14 for shorting the conductor substrate portions 8D and 8E is provided on an end portion distal to the slider attachment portion 8A of each of the upper side electrodes 9A provided on the upper sides of the first and second thin film piezoelectric elements 11A and 11B.

As shown in FIGS. 4 and 7, end portions proximal to the slider attachment portion 8A of the lower side electrodes 9B provided on the lower sides of the first and second thin film piezoelectric elements 11A and 11B are not covered with the flexible material 6 and are connected to terminals 13A and 13D, respectively. Therefore, the terminals 13A and 13B are exposed from the flexible material 6. Further, the terminal 13C is connected to a lower surface of a middle portion in a width direction or a portion close to the conductor substrate portions 8D and 8E of the conductor portion 8C. The terminal 13C is also exposed from the flexible material 6.

The terminal 13C connected to the conductive conductor portion 8C and the upper electrodes 9A provided on the respective thin film piezoelectric elements 11A and 11B are shorted by the short member 14.

The terminals 13A through 13C (FIG. 4) provided on the lower side of the conductor substrate portions 8D and 8E are connected to the respective terminals 15A through 15C (FIG. 2) on the thin film piezoelectric terminal holding portion 7A of the thin film piezoelectric drive conductor pattern 7 which is positioned around the drive of the beam portion 4C.

As shown in FIG. 2, the slider 2 is disposed on the slider attachment portion 8A of the thin film piezoelectric substrate 8 which it provided on the slider holding plate 3. The slider 2 is connected via the four terminal portions provided on the slider attachment portion 8 to the conductor patterns 12A, 12B, 12C and 12D, respectively.

Operation of the head support mechanism 100 having such a structure will be described with reference to FIGS. 8 through 10. The terminal portion 13C (FIG. 4) provided at a linkage portion of the conductor substrate portions 8D and 8E of the thin film piezoelectric substrate 8 is set to the ground level via the thin film piezoelectric drive conductor pattern 7 (FIG. 2). As shown in FIG. 7, since the terminal 13C shorts the upper side electrodes 9A provided on the upper sides of the first and second thin film piezoelectric elements 11A and 11B, the upper side electrodes 9A are set to the ground level. A voltage $V_0$ is applied to one terminal 13A (FIG. 4) of the first conductor substrate portion 8D of the thin film piezoelectric substrate 8, and a voltage of zero is applied to the terminal 13B (FIG. 4) of the second conductor substrate portion 8E.

In this way, the voltage $V_0$ between the upper electrode 9A and the lower electrode 9B of the first thin film piezoelectric element 11A provided on the first conductor substrate portion 8D is applied to the first thin film piezoelectric element 11A. Meanwhile, a voltage is not applied between the upper electrode 9A and the lower electrode 9B of the second thin film piezoelectric element 11B provided on the second conductor substrate portion 8E.

Figure 8:
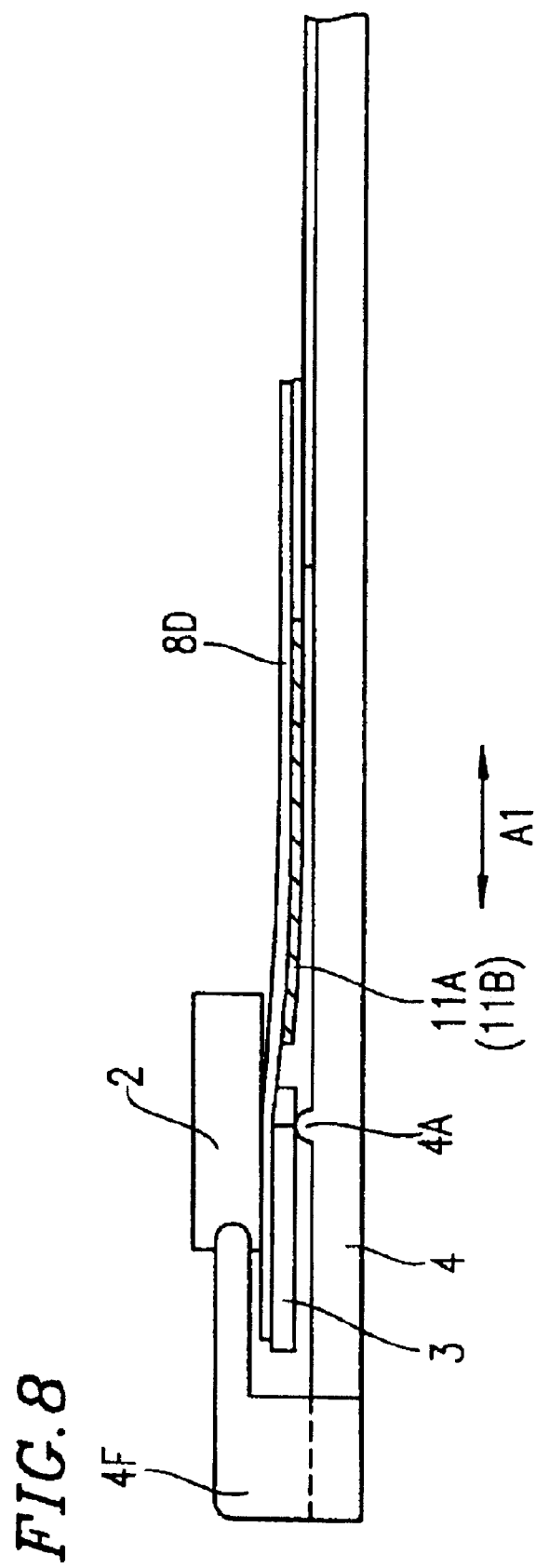
FIG. 8 is a side view of a major part of the head support mechanism of Example 1, used for explaining operation thereof.
Figure 9:
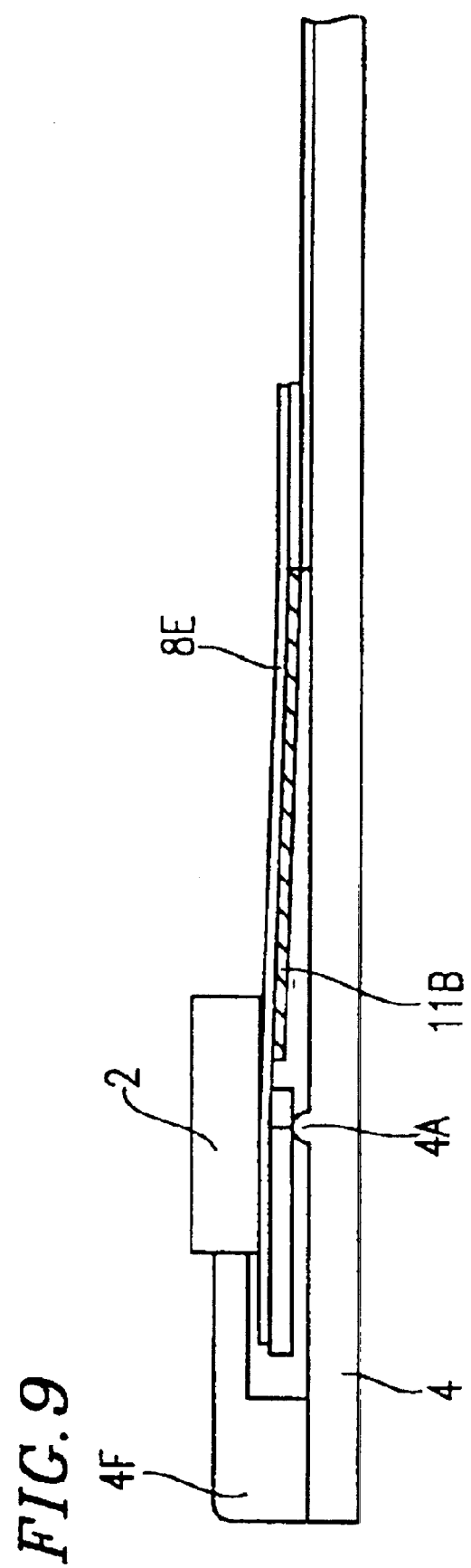
FIG. 9 is a side view of a major part of the head support mechanism of Example 1, used for explaining operation thereof.

As a result, the first thin film piezoelectric element 11A extends in its longitudinal direction (indicated by arrow A1 in FIG. 8). In this case, since the conductor substrate portion 8D stacked on the first thin film piezoelectric element 11A is made of stainless steel, copper, or the like, the conductor substrate portion 8D is considerably rigid in the extension direction(indicated by arrow A1 in FIG. 8). The first thin film piezoelectric element 11A and the conductor substrate portion 8D are bent toward a magnetic disk due to a bimorph effect, as shown in FIG. 8. In contrast, since a voltage is not applied to the second thin film piezoelectric element 11B, the second conductor substrate portion 8E in not substantially bent.

Figure 10:
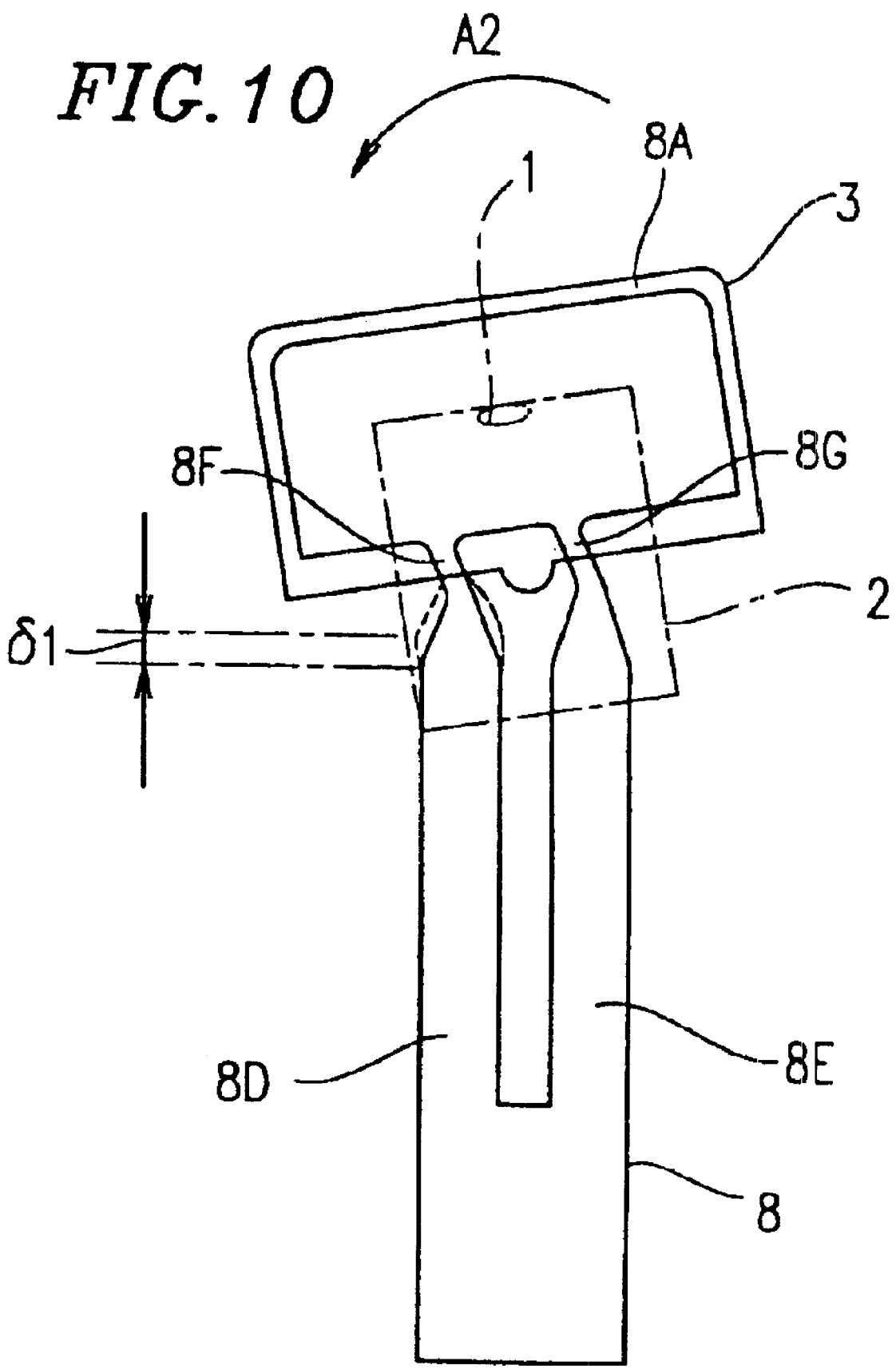
FIG. 10 is a top view of a major part of the head support mechanism of Example 1, used for explaining operation thereof.

FIG. 10 is a top view illustrating states of the conductor substrate portions 8D and 8E of the thin film piezoelectric substrate 8.

The first thin film piezoelectric element 11A and the conductor substrate portion 8D which are bent are shorter by a small displacement δ1 than the second thin film piezoelectric element 11B and the conductor substrate portion 8E which are not bent. As a result, the slider holding plate 3 is rotated by a small amount in a direction indicated by arrow A2 in FIG. 10. Therefore, the slider 2 provided on the slider holding plate 3 is rotated on the dimple 4G (FIG. 2) by a small amount in the game direction.

In contrast, when the voltage $V_0$ is applied to one terminal 13B of the second conductor substrate portion 8E of the thin film piezoelectric substrate 8 and the voltage zero is applied to the terminal 13E of the first conductor substrate portion 8D, the second thin film piezoelectric element 11B and the conductor substrate portion 8E are bent and the second thin film piezoelectric element 11B and the conductor substrate portion 8E are not bent. Therefore, the slider 3 is rotated on the dimple 4G by a small amount in a direction opposite to the direction indicated by arrow A2 in FIG. 10. The slider 2 provided on the slider holding plate 3 is also rotated by a small amount in the same direction.

Therefore, the head 1 provided on the slider 2 is moved along a width direction of each track provided in the form of a concentric circle on a magnetic disk. Thereby, an on-track characteristic can be improved. The on-track characteristic means an ability of the head 1 to follow a track.

In this case, a load on the elastic hinge portions 8F and 8G upon rotation of the slider attachment portion 8A is reduced so that the slider attachment portion 8A can be reliably rotated, since the conductor patterns 12A, 12B. 12C and 12D each have a minimum width.

A load (20 to 30 mN) in applied to the slider 2 via the plate spring 4E (FIG. 2) of the load beam 4. When the slider holding plate 3 is rotated, such a load is applied between the dimple 4G (FIG. 2) and the slider holding plate 3. Therefore, a frictional force determined by a frictional coefficient between the slider holding plate 3 and the dimple 4G is applied to the slider holding plate 3. Thereby, the frictional force prevents the slider holding plate 3 from being deviated from the dimple 4G, although the projection portion 3A of the slider holding plate 3 can be freely rotated on the dimple 4G.

The same voltage is applied to the first and second thin film piezoelectric elements 11A and 11B so as to operate in the same manner. Alternatively, when the first and second thin film piezoelectric elements 11A and 11B are bent in the absence of applied voltage, voltages having opposite phases may be applied to the respective first and second thin film piezoelectric elements 11A and 11B to drive the first thin film piezoelectric element 11A and the conductor substrate portion 8D, and the second thin film piezoelectric element 11B and the conductor substrate portion 8E.

Further, in the example shown in FIG. 8, a voltage is applied to the first thin film piezoelectric element 11A so that the first thin film piezoelectric element 11A is bent to become a convex shape. Alternatively, a voltage may be applied to the first thin film piezoelectric element 11A so that the first thin film piezoelectric element 11A is bent to become a concave shape.

In Example 1, when the head 1 is moved in a radial direction of a disk, the displacement magnitude or the head 1 was about 1 μm where the thin film piezoelectric substrate 8 was about 3 μm thick, the first and second thin film piezoelectric elements 11A and 11B each were about 2 μm thick, the length of first and second thin film piezoelectric elements 11A and 11B each were about 2 mm, and a voltage of 5 V was applied between the upper and lower electrodes 9A and 9B.

Since the slider holding plate 3 is supported on the dimple 4G in such a manner that the slider holding plate 3 can be rotated in all directions, the frictional loss of the slider holding plate 3 upon rotation can be significantly reduced. Therefore, a small magnitude of driving force can lead to a great amount of displacement of the head 1. Further, the slider 2 is supported in such a manner that the slider 2 can be rotated on the center position M1 of the air bearing surface 2E. Therefore, the position of the head 1 on the slider 2 is unlikely to be disturbed by a frictional force due to the viscosity of air.

In Example 1, the beam structure composed of the conductor substrates 8D and 8E and the thin film piezoelectric elements 11A and 11B is considerably rigid in the direction A1 shown in FIG. 8. Therefore, the vibrational resonance point of the head support mechanism 100 can be structurally set to a high value. Thereby, the head support mechanism 100 can operate with an excellent response characteristic when the thin film piezoelectric elements are driven at high frequency.

EXAMPLE 2

Example 2 of the present invention will be described below.

Figure 11:
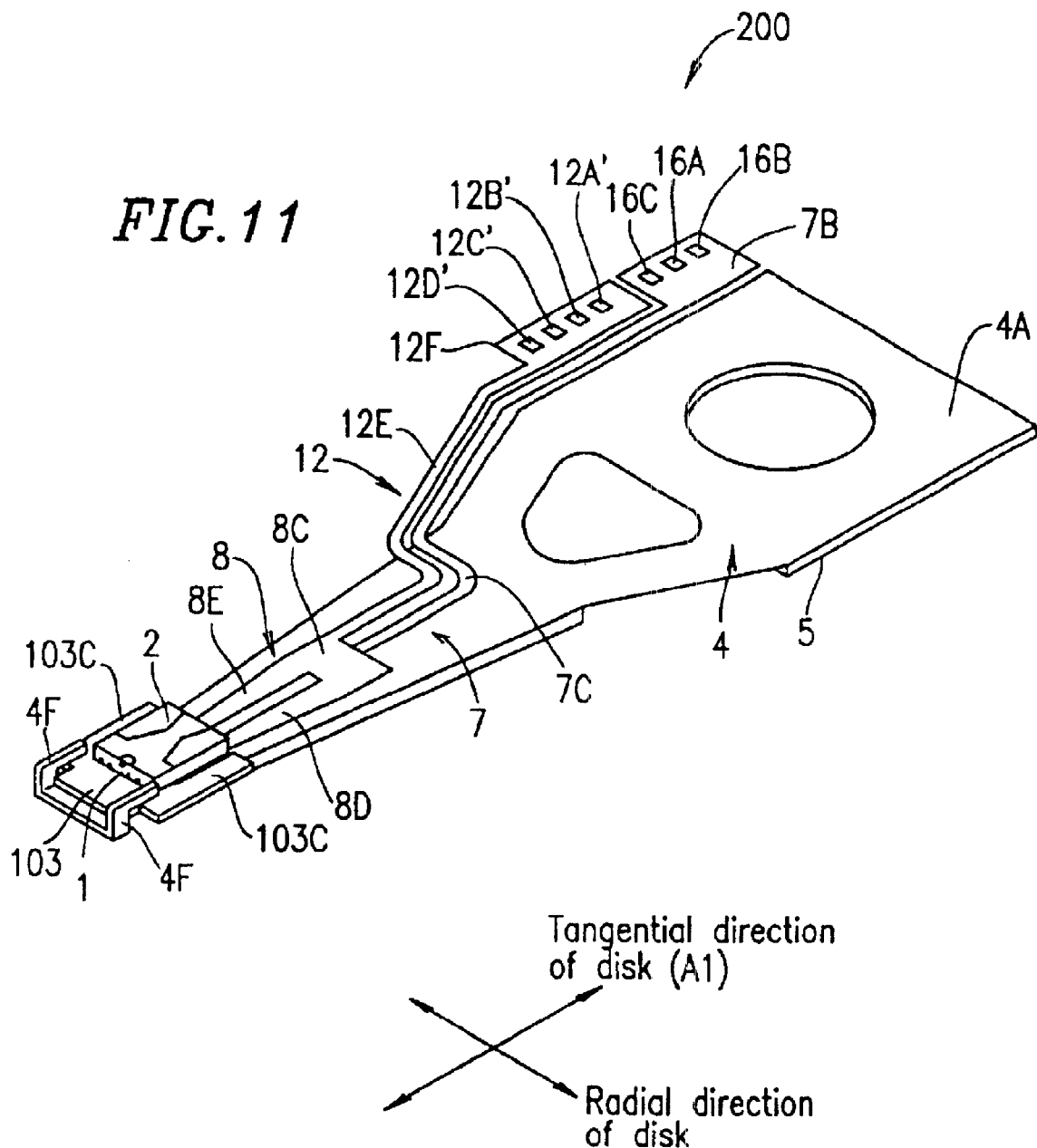
FIG. 11 is a perspective view illustrating a head support mechanism according to Example 2 of the present invention.
Figure 12:
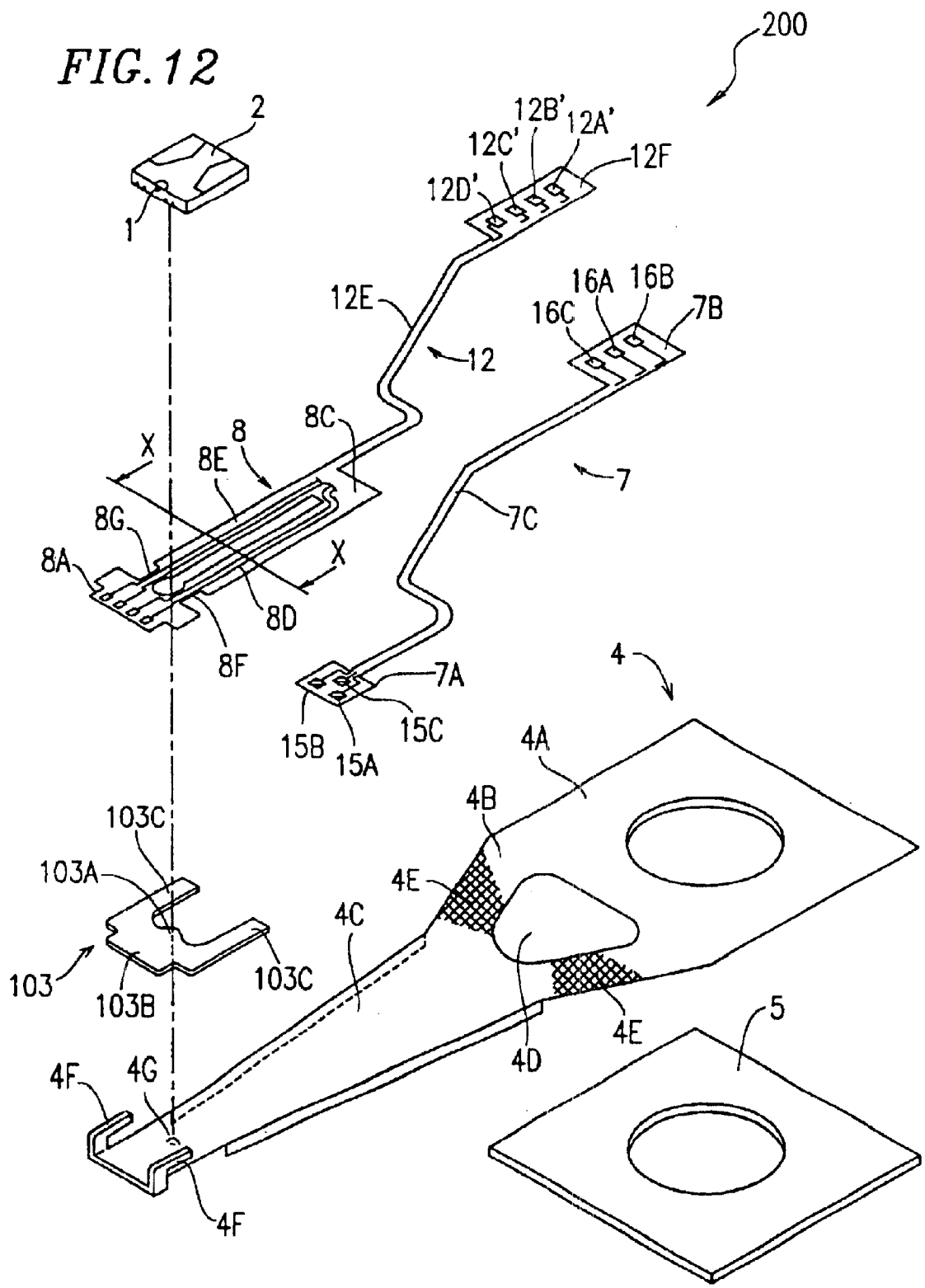
FIG. 12 is an exploded, perspective view illustrating the head support mechanism of Example 2.

FIG. 11 is a perspective view illustrating a head support mechanism 200 for use in a disk apparatus according to Example 2 of the present invention, viewed from a disk side. FIG. 12 is an exploded, perspective view illustrating the head support mechanism 200. Components similar to the corresponding components described in Example 1 are designated by the same reference numerals as used in Example 1. The description of such components is therefore omitted.

The head support mechanism 200 of Example 2 includes: a slider 2 carrying a head 1, a slider holding plate 103 holding the slider 2; a load beam 4 supporting the slider 2 and the slider holding plate 103 in such a manner that the slider 2 and the slider holding plate 103 can rotate; a thin film piezoelectric plate 8 for rotating the slider 2; a first conductor pattern 12 provided so as to extend from an end of the thin film piezoelectric plate 8; and a second conductor pattern 7 provided along the first conductor pattern 12.

The load beam 4 includes, a square-shaped base portion 4A; a neck portion 4B; and a tapering beam portion 4C extending from the neck portion 4B.

A square-shaped base plate 5 is attached by beam welding to a bottom side of the base portion 4A of the load beam 4. The base plate 5 is also attached to a head actuator (not shown) in such a manner that the base plate 5 can rotate. The load beam 4 is rotated on the base portion 4A in such a manner that the tip of the beam portion 4C is moved substantially in a radial direction of a magnetic disk (not shown). That is, the load beam 4 is driven to rotate so that the head 1 is moved substantially in a radial direction of a magnetic disk.

An opening portion 4D is provided in a middle of the neck portion 4B of the load beam 4. In the neck portion 4B, portions on the opposite sides of the opening portion 4D each function as a plate spring portion 4B. The beam portion 4C is elastically displaced in a direction perpendicular to a surface of a magnetic disk by the plate spring portions 4E. The elastic displacement of the beam portion 4C causes a load to be applied on the slider 2 provided on the tip portion of the beam portion 4.

A hemisphere-shaped dimple 4G projecting upward is integrated into the tip portion of the beam portion 4C. Further, a pair of regulation portions 4F extending straight from the tip portion of the beam portion 4C toward the base portion 4A are provided on the tip portion of the beam portion 4C. There is an appropriate gap between each regulation portion 4F and the upper surface of the bean portion 4C.

The slider holding plate 103 is provided on the tip portion of the beam portion 4C. The slider 2 is provided on the slider holding plate 103 via the tip portion of the thin film piezoelectric substrate 8. As shown in FIG. 12, a substrate junction portion 103B, which is joined to a lower side of the tip portion of the thin film piezoelectric substrate 8, 15 provided at a tip portion of the slider holding plate 103. The slide holding plate 3 includes a pair of balance weight portions 103C extending toward the base portion 4A. A semicircle-shaped projection portion 103A slightly projecting toward the base portion 4A is provided in a middle of the slider holding plate 103 and between the pair of balance weight portions 103C.

The slider holding plate 103 is supported on the dimple 4G provided on the tip portion of the beam portion 4C of the load beam 4 where a lower side of the projection portion 103A contacts a point of the dimple 4G. The balance weight portions 103C are provided at a small gap from the regulation portions 4F provided on the tip portion of the beam portion 4C. Therefore, the slider holding plate 103 can be rotated in all directions so as to be displaced by a small angle along with the slider 2 provided on the slider holding plate 103. The center of gravity of the rotatable slider holding plate 103 carrying the slider 2 substantially corresponds to the center point of the rotation, i.e., the dimple 4G.

Figure 13:
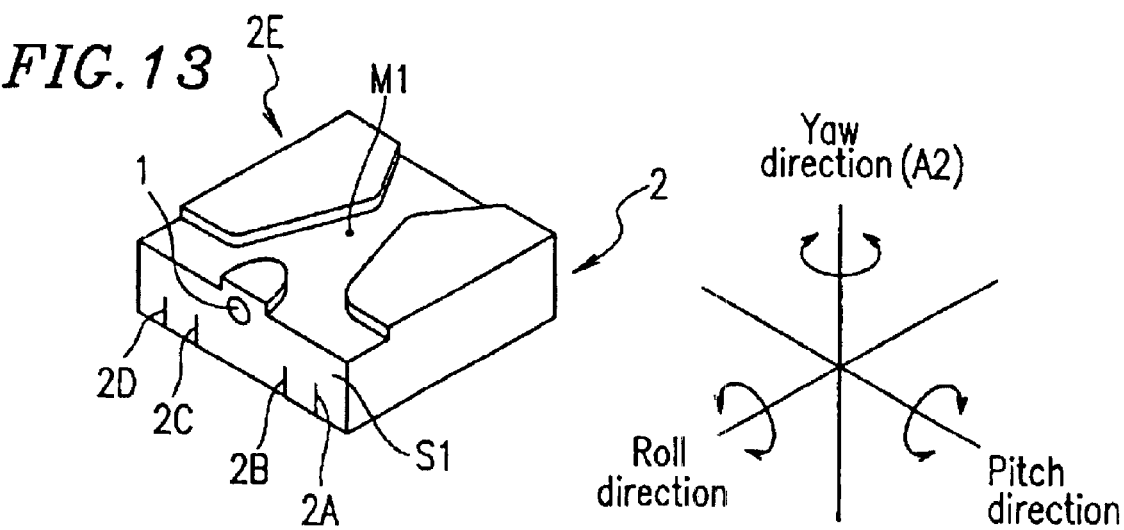
FIG. 13 is a perspective view illustrating a slider for use in the head support mechanism of Example 2.

FIG. 13 is a perspective view illustrating a slider 2. The head 1 including an MR element is provided in a middle of an upper edge portion on a tip side of the slider 2. Four terminals 2A through 2D are arranged in a transverse direction in a lower edge portion of the tip side of the slider 2. An upper side or the slider 2 faces a surface of a magnetic disk. Further, an air bearing surface 2E is provided on the upper side of the slider 2. An air flow generated by a rotating magnetic disk is passed in a tangential direction of the magnetic disk so that an air lubricating film is generated between the air bearing surface 2B and the magnetic disk.

A center position M1 of the air bearing surface 2B substantially correspond to the dimple 4G on which the slider holding plate 3 is rotated and which substantially corresponds to the center of gravity of the slider holding plate 3. The slider 2 is supported on the slider attachment portion 8A in such a manner that the side S1 of the slider 2 faces the tip portion of the beam portion 4C of the load beam 4. The slider 2 can be rotated on the center position M1 of the air bearing surface 2E by a small amount in all of the following directions; a pitch direction which is a direction of rotation around an axis in a longitudinal direction of the beam portion 4C through the head 1; a roll direction which is a direction of rotation around an axis along the air bearing surface 2E perpendicular to a longitudinal axis of the beam portion 4C; and a yaw direction which is a direction of rotation around an axis perpendicular to both the center axis of the pitch direction and the center axis of the roll direction. When the slider 2 is rotated by a small displacement angle in the yaw direction, the head 1 is moved by a small displacement substantially in a radial direction of a magnetic disk.

Note that the head 1 is disposed so as to face a surface of a magnetic disk, and more specifically, to face in a tangential direction of the magnetic disk.

Figure 14:
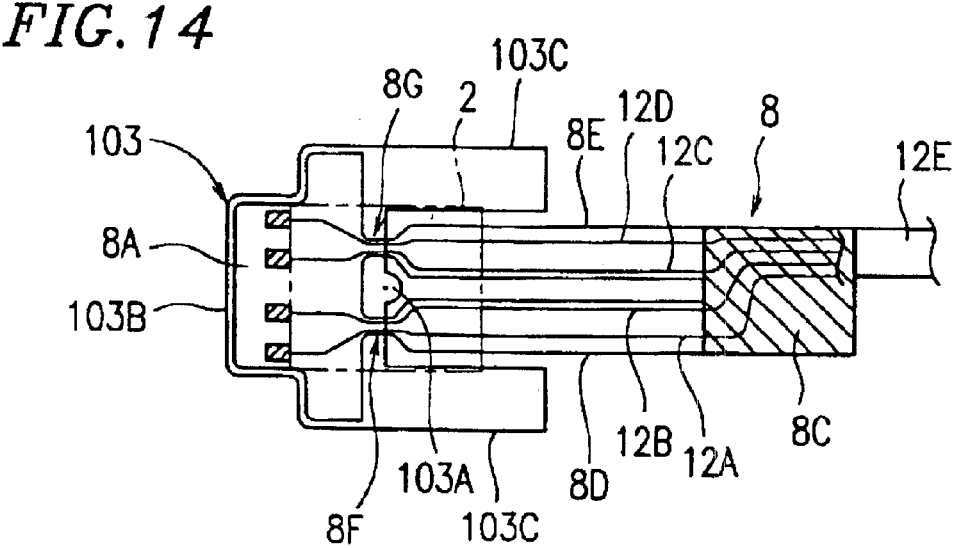
FIG. 14 is a top view illustrating a major part of a thin film piezoelectric element substrate for use in the head support mechanism of Example 2, and the vicinity thereof.
Figure 15:
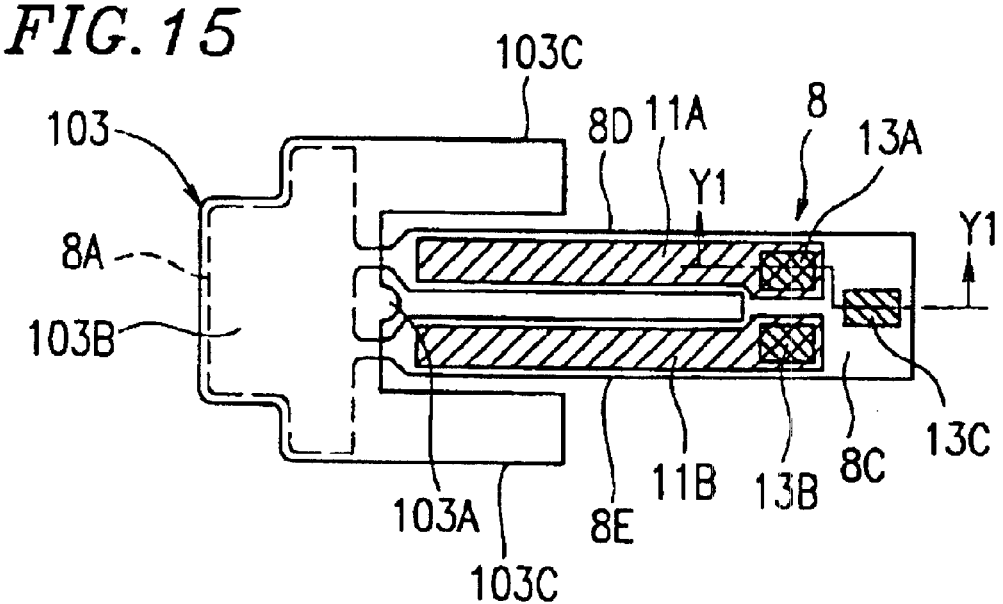
FIG. 15 is a bottom view illustrating a major part of the thin film piezoelectric element substrate of Example 2, and the vicinity thereof.
Figure 16:
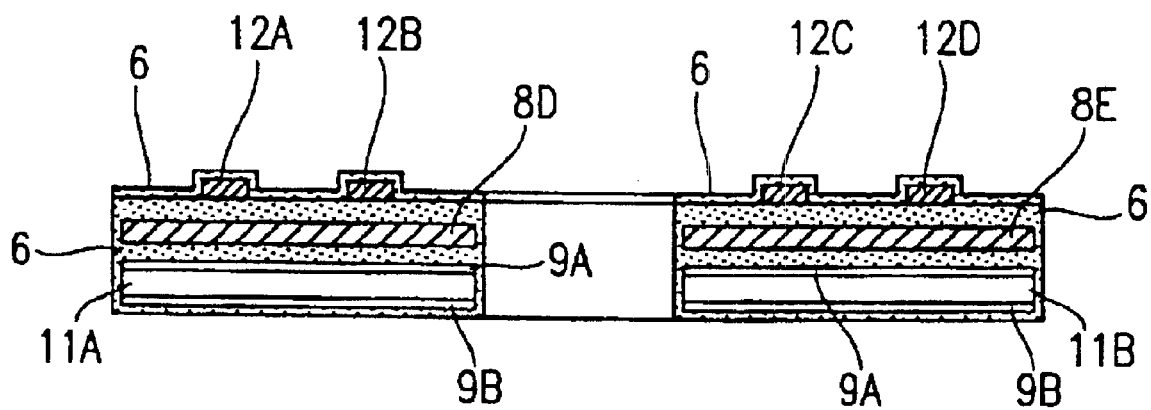
FIG. 16 is a cross-sectional view of FIG. 12 taken along line X—X.
Figure 17:
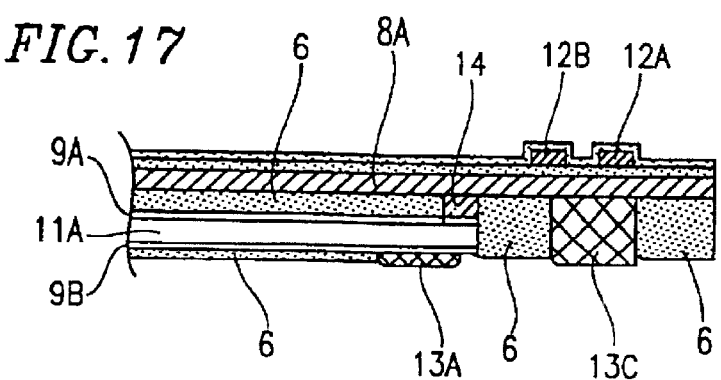
FIG. 17 is a cross-sectional view of FIG. 15 taken along line Y1—Y1.

FIGS. 14 and 15 are top and bottom views illustrating the thin film piezoelectric substrate 8 provided on the load beam 4 and the vicinity thereof. FIG. 16 is a cross-sectional view taken along line X—X shown in FIG. 12. FIG. 17 is a cross-sectional view taken along line Y1—Y1 shown in FIG. 15.

As shown in FIG. 12, the thin film piezoelectric substrate 8 is in the shape of a rectangle extending from the tip portion of the load beam 4 toward the base portion 4A of the load beam 4. The thin film piezoelectric substrate 8 is provided along a surface of a magnetic disk. The thin film piezoelectric substrate 8 may be made of a flexible, thin stainless steel plate or the like.

As shown in FIGS. 14 and 15, the slider 2 in attached to the upper side of the tip portion of the thin film piezoelectric substrate 8, while a slider support portion 8A is provided on the lower side of the tip portion of the thin film piezoelectric substrate 8. The slider support portion 8A is joined to the substrate junction portion 3B of the slider holding plate 103. Substantially half of the tip portion side of the slider 2 is provided and attached to the slider support portion 8A.

A pair of transformation operation portions 8D and 8E which are transformed in a direction perpendicular to a surface of a magnetic disk with different phases, are provided at an end at the base portion 4A side of the slider support portion 8A, via elastic hinge portions 8F and 8G. Thus, the transformation operation portions 8D and 8E are integrated with the slider support portion 8A. A fixed portion 8C is provided on the upper side of the beam portion 4C of the load beam 4.

The pair of transformation operation portions 8D and 8E are disposed in parallel and spaced at a predetermined gap by providing a slit in an intermediate portion in a width direction of the thin film piezoelectric substrate 8. The pair of elastic hinge portions 8F and 8G are formed by reducing the width of tip portions of the transformation operation portions 8D and 8E. The slider support portion 8A can be rotated in the directions other than the yaw direction due to the elastic hinge portions 8F and 8G. Therefore, the slider 2 which is provided on the upper side of the slider support portion 8A and the slider holding plate 103 provided on the lower side of the slider support portion 8A is not rotated in the yaw direction.

First and second thin film piezoelectric elements 11A and 11B are provided on the lower side of the thin film piezoelectric substrate 8. The first and second thin film piezoelectric elements 11A and 11B are provided on the lower side of the pair of transformation operation portions 8D and 8E and on the lower side of the fixed portion 8C, resulting in a multi-layer structure. The thin film piezoelectric element; 11A and 11D and the transformation operation portions 8D and 8E are covered with a flexible material 6 and integrated with the thin film piezoelectric substrate 8. The thin film piezoelectric elements 11A and 11D each expand in a longitudinal direction thereof in the presence of applied voltage between the upper and lower sides thereof, depending on the value of the voltage. The expansion of the thin film piezoelectric elements 11A and 11B causes the transformation operation portions 8D and 8E to be bent in a thickness direction thereof. As a result, the thin film piezoelectric substrate 8 is displaced in a direction perpendicular to a surface of a magnetic disk.

An upper side electrode 9A and a lower side electrode 9B made of platinum are provided on the upper side and the lower side of the first thin film piezoelectric element 11A, respectively. Similarly, an upper side electrode 9A and a lower side electrode 9B made of platinum are provided on the upper side and the lower side of the second thin film piezoelectric element 119, respectively.

As shown in FIGS. 15 and 17, three terminal portions 13A, 13B, and 13C are provided on the lower side of the fixed portion 8C of the thin film piezoelectric substrate 8 in such a manner that the three terminal portions 13A, 13B, and 13C are exposed from the flexible material 6. The pair of the terminal portions 13A and 13B are attached to end portions (at the base portion 4A side) of the respective lower side electrodes 9B. The terminal portion 13C is connected to a short member 14 which electrically shorts the end portions of the upper side electrodes 9A.

As shown in FIG. 14, a first conductor pattern 12 composed of four conductor lines 12A through 12D is provided on the upper side of the thin film piezoelectric substrate 8 so as to transfer a recording and reproducing signal to and from the head 1. One end of the four conductor lines 12A through 12D are connected to respective terminals 2A through 2D of the slider 2 provided on the upper side of the slider support portion 8A of the thin film piezoelectric substrate 8.

A pair of the conductor lines 12A and 12B of the first conductor pattern 12 are drawn to the base portion 4A side via the transformation operation portion 8D and the fixed portion 8C of the thin film piezoelectric substrate 8. The other pair of the conductor lines 12C and 12D of the first conductor pattern 12 are drawn to the base portion 4A side via the transformation operation portion 8E and the fixed portion 8C of the thin film piezoelectric substrata 8.

The four conductor lines 12A through 12D drawn to the base portion 4A side of the thin film piezoelectric substrate 8 pass through a conductor portion 12E of the first conductor pattern 12 and reach a terminal holding portion 12F, and are connected to respective externally connected terminals 12A' through 12D' on the terminal holding portion 12F (FIG. 12).

As shown in FIG. 16, the four conductor lines 12A through 12D are fixed to the upper side of the thin film piezoelectric substrate 8 using the flexible material 6.

Referring to FIG. 12, a second conductor pattern 7 is used to drive the first and second thin film piezoelectric elements 11A and 11B provided on the lower side of the thin film piezoelectric substrate 8. The second conductor pattern 7 includes three conductor lines. One end of the conductor lines are connected to respective internally connected terminals 15A through 15C. The three internally connected terminals 15A through 15C are connected to respective terminal portions 13A through 13C (FIG. 15) provided on the lower side of the fixed portion 8C of the thin film piezoelectric substrate 8. The fixed portion 8C is fixed via a terminal holding portion 7A on the upper side of the beam portion 4C of the load beam 4 as shown in FIG. 4.

As shown in FIG. 12, the three conductor lines provided on the second conductor pattern 7 pass through a conductor portion 7C of the second conductor pattern 7 and reach the terminal holding portion 7B, and are connected to respective externally connected terminals 16A, 16B, and 16C on the terminal holding portion 7B.

As shown in FIG. 11, the terminal holding portion 12F of the first conductor pattern 12 and the terminal holding portion 7B of the second conductor pattern 7 are attached to one edge portion of the base portion 4A of the load beam 4, being arranged side by side in the longitudinal direction of the load beam 4.

Operation of the thus-constructed head support mechanism 200 will be described with reference to FIGS. 18 through 27.

Referring to FIGS. 12, 15 and 17, the upper electrodes 9A provided on the upper sides of the first and second thin film piezoelectric elements 11A and 11B are grounded via the short member 14, the terminal portion 13C, and the internally connected terminal 15C and the externally connected terminal 16C of the second conductor pattern 7.

Further, a voltage V is applied to the lower electrode 9B joined with the lower side of the first thin film piezoelectric element 11A, via the externally connected terminal 16A and the internally connected terminal 15A of the second conductor pattern 7. Further, a voltage zero is applied to the lower electrode 9B joined with the lower side of the second thin film piezoelectric element 11B, via the externally connected terminal 16B and the internally connected terminal 15B of the second conductor pattern 7 and the terminal portion 13B.

Therefore, the voltage V between the upper side electrode 9A and the lower side electrode 9B is applied to the first thin film piezoelectric element 11A. As a result, the first thin film piezoelectric element 11A expands in a longitudinal direction thereof (indicated by arrow A1 in FIG. 1).

In this case, since the transformation operation portion 8D of the thin film piezoelectric substrate 8 provided on the first thin film piezoelectric element 11A is made of stainless steel or the like, the rigidity in an expanding direction (indicated by arrow A1 in FIG. 18) of the transformation operation portion 8D is increased. Therefore, the transformation operation portion 8D of the thin film piezoelectric substrate 8 provided on the first thin film piezoelectric element 11A is bent due to a bimorph effect in a direction away from a surface of a magnetic disk, i.e., in such a manner as to project toward the thin film piezoelectric elements 11A and 11B side.

Figure 19:
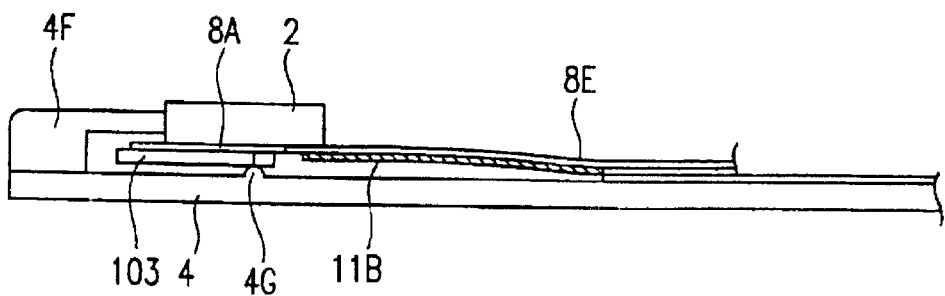
FIG. 19 is a side view of a major part of the head support mechanism of Example 2, used for explaining operation thereof.

In contrast, a voltage is not applied to the second thin film piezoelectric element 11B. Therefore, as shown in FIG. 19, the second thin film piezoelectric element 11B and the transformation operation portion 8E of the thin film piezoelectric substrate 8 provided on the second thin film piezoelectric element 11B are not substantially bent.

Figure 20:
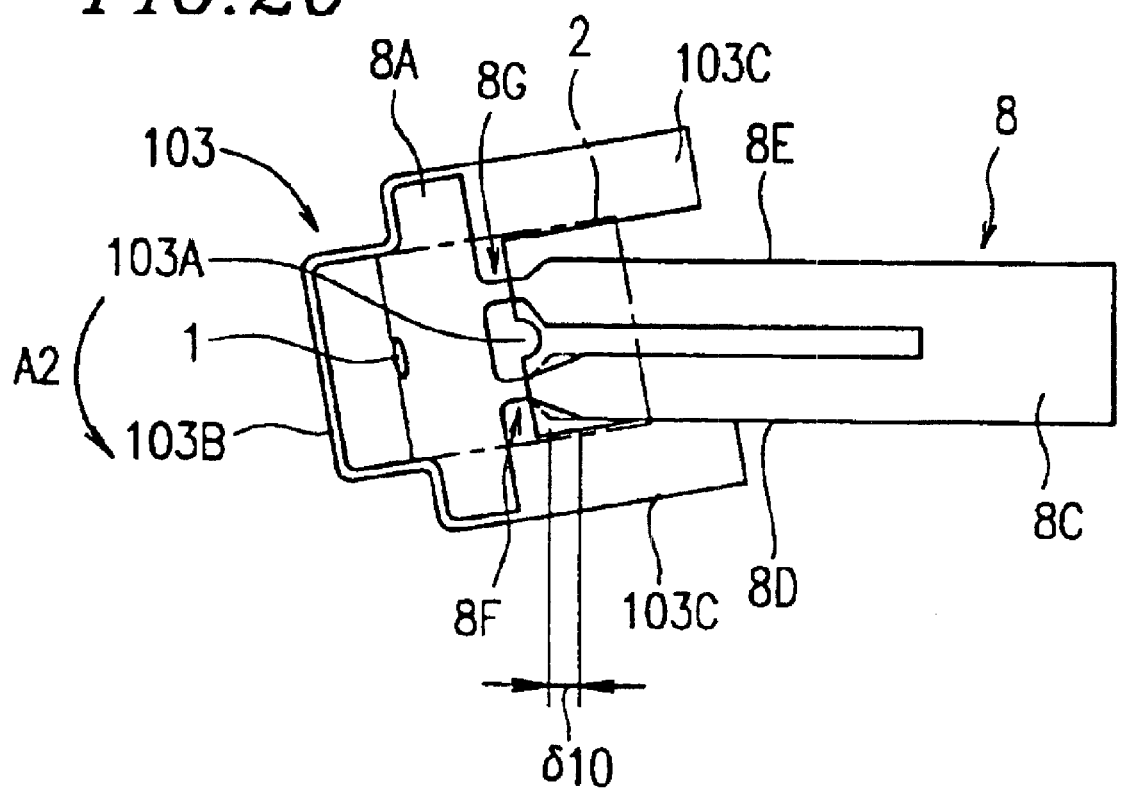
FIG. 20 is a top view of a major part of the head support mechanism of Example 2, used for explaining operation thereof.

Referring to FIG. 20, when the transformation operation portion 8D is bent, the length in the longitudinal direction of the transformation operation portion 8D, which is projected onto the same plane as the transformation operation portion 8E which is not bent, is shorter by a small displacement δ1 than the length of the transformation operation portion 8E which is not bent. Therefore, the slider support portion 8A of the thin film piezoelectric substrate 8 is rotated by a small amount in the yaw direction indicated by arrow A2 in FIG. 20, while the slider 2 and the slider holding plate 103 are also rotated on the dimple 4G (FIG. 12) by a small amount in the same direction.

In contrast, when a voltage zero is applied to the lower side electrode 9B provided on the lower side of the first thin film piezoelectric element 11A and a voltage V is applied to the lower side electrode 9B provided on the lower side of the second thin film piezoelectric element 11B, the transformation operation portion 8D of the thin film piezoelectric substrate 8 provided on the first thin film piezoelectric element 11A is not substantially bent, and the transformation operation portion 8E of the thin film piezoelectric substrate 8 provided on the second thin film piezoelectric element 11B is bent.

Therefore, the slider support portion 8A of the thin film piezoelectric substrate 8 is rotated by a small amount in the yaw direction opposite to the direction indicated by arrow A2 in FIG. 20. As a result, the slider 2 and the slider holding plate 103 are rotated on the dimple 4G (FIG. 12) by a small amount in the same direction.

As described above, voltages having opposite phases are applied to the respective first and second thin film piezoelectric elements 11A and 11B so that the head 1 carried on the slider 2 is moved with great precision by a small size of displacement corresponding to applied voltage, in a radial direction of a magnetic disk, i.e., a width direction of each track in the form of a concentric circle on the magnetic disk. Therefore, an on-track operation for causing the head 1 to follow a track can be conducted with great precision.

Note that the elastic hinge portions 8G and 8F connecting the slider support portion 8A and the transformation operation portions 8D and 8E of the thin film piezoelectric substrate 8 are designed to be minimum sizes so that the conductor lines 12A and 12B, and 12C and 12D of the conductor pattern 12 are provided on the respective elastic hinge portions 8G and 8F. Therefore, a load required for rotation of the slider support portion 8A is reduced, whereby the slider support portion 8A can be reliably rotated by a small load.

Further, when a load (20 to 30 mN) is applied to the slider 2 by the plate spring portions 4E and 4E of the load beam 4 (FIG. 12) so that the slider holding plate 103 is rotated, such a load is also applied between the dimple 4G and the slider holding plate 103. Therefore, frictional force determined by a frictional coefficient between the slider holding plate 103 and the dimple 4G is applied to the slider holding plate 103. Thereby, the frictional force prevents the slider holding plate 103 from being shifted from the dimple 4G, although the projection portion 103A of the slider holding plate 103 can be rotated on the dimple 4G.

The same voltage is applied to the first and second thin film piezoelectric element 11A and 11B so as to operate in the same manners. Therefore, the first and second thin film piezoelectric elements 11A and 11B may be designed to be bent in the absence of applied voltage, and voltages having opposite phases may be applied to the respective first and second thin film piezoelectric elements 11A and 11B to drive the first thin film piezoelectric element 11A and the transformation operation portion 8D, and the second thin film piezoelectric element 11B and the transformation operation portion 8E.

In Example 2, a voltage is applied to the thin film piezoelectric elements 11A and 11B so that the thin film piezoelectric elements 11A and 11B are bent to become a convex shape. Alternatively, a voltage may be applied to the thin film piezoelectric elements 11A and 11B so that the thin film piezoelectric elements 11A and 11B are bent to become a concave shape.

Note that the elastic hinge portions 8G and 8F are each sufficiently flexible so that the slider 2 can be rotated in the roll direction and the pitch direction. Therefore, a floating characteristic of the slider 2 with respect to a magnetic disk can be improved by the air bearing due to the air bearing surface 2E.

The dynamic characteristics of the head support mechanism of the present invention will be described below.

Figure 21A:
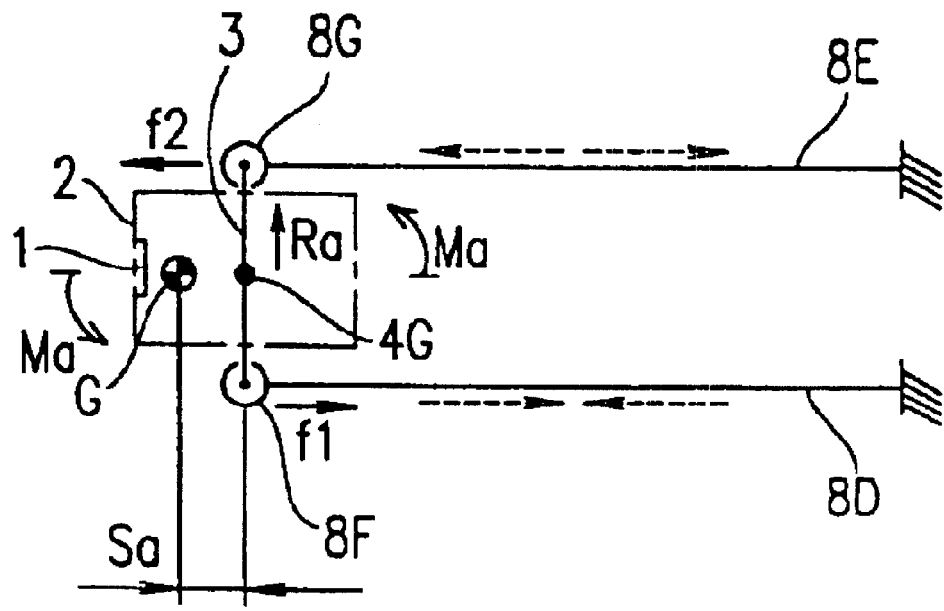
FIGS. 21A and 21B are schematic diagrams used for explaining operation the head support mechanism of Example 1.
Figure 21B:
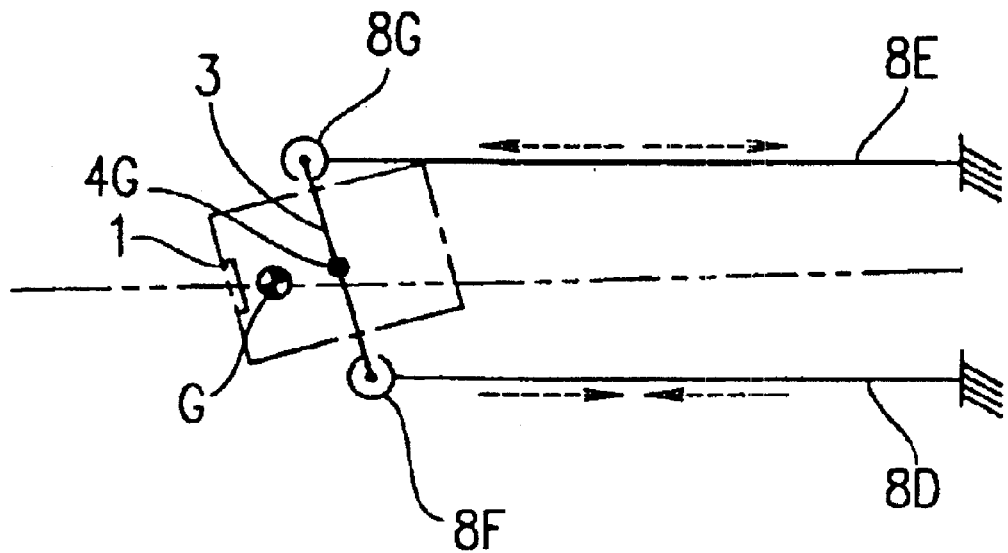
Figure 22A:
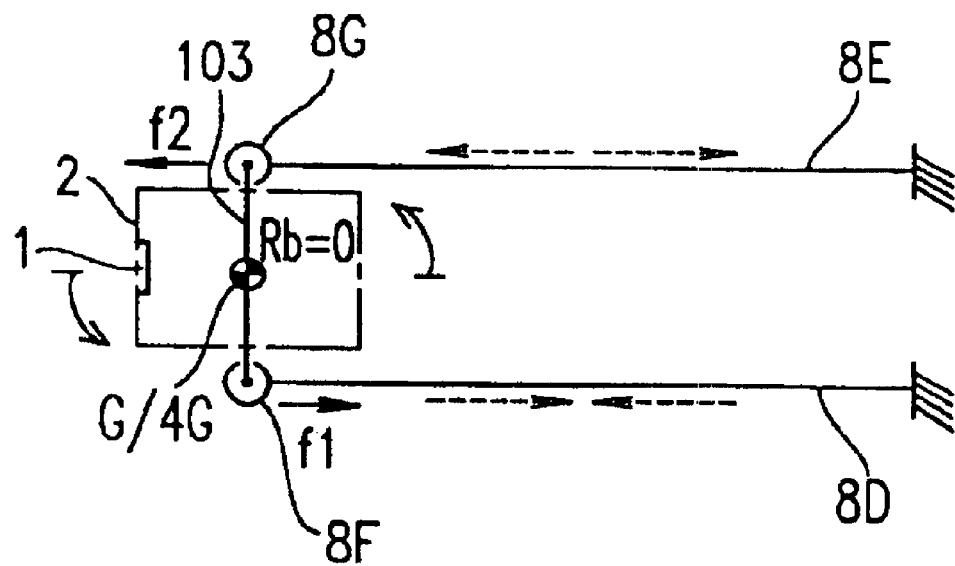
FIGS. 22A and 22B are schematic diagrams used for explaining operation the head support mechanism of Example 2.

FIGS. 21A and 21B and FIGS. 22A and 22B are schematic diagrams illustrating two models of a head support mechanism. FIGS. 21A and 21B illustrate a head support mechanism in which the center of gravity G of a small rotation portion including the slider 2 and the slider holding plate 3 is positioned between the dimple 4G and the head 1. FIGS. 22A and 22E illustrate the head support mechanism 200 of Example 2 in which the center of gravity G of a small rotation portion including the slider 2 and the slider holding plate 103 substantially corresponds to the position of the dimple 4G.

When voltages having opposite phases are applied to the respective first and second thin film piezoelectric elements 11A and 11B so that the transformation operation portion 8D is contracted and the transformation operation portion 8E is expanded, a tracking characteristic of the head 1 with respect to a target track on a magnetic disk is greatly affected by the position of the center of gravity G.

A description will be given of when the center of gravity G of the small rotation portion including the slider 2 and the slider holding plate 3 is positioned between the dimple 4G and the head 1 as shown in FIGS. 21A and 21B.

As shown in FIG. 21A, when the transformation operation portion 8D and 8E are contracted and expanded, respectively, forces F1 and F2 having opposite directions are generated in the elastic hinge portions 8G and 8F, respectively. In this case, the slider holding plate 3 can be freely displaced in the contraction and expansion directions of transformation operation portion 8D and 8E due to the dimple 4G provided on the load beam 4. On the other hand, the slider holding plate 3 is restrained in the bend direction of the transformation operation portion 8D and 8E due to frictional force. As a result, an angular moment Ma around the center of gravity G is generated by the forces F1 and F2, which acts on the slider 2 and the slider holding plate 3.

As shown in FIGS. 21A and 21B, assuming that the distance between the center of gravity G and the dimple 4G is Sa in a longitudinal direction or the beam portion 4C of the load beam 4, a reaction force Ra(=Ma/Sa) is generated to act the dimple 4G. The force Ra leads to transformation of the beam portion 4C of the load beam 4. FIG. 21B schematically shows such a situation.

As shown in FIG. 21B, even if the slider 2 is rotated in the counterclockwise direction, the transformation operation portions 8D and 8E are transformed by the reaction force Ra so that the head 1 is not moved over a predetermined amount. Since the slider 2 and the slider holding plate 3 each have a mass, the slider 2 and the slider holding plate 3 have a delayed response to the transformation of the transformation operation portions 8D and 8E.

FIGS. 24A and 24B are graphs showing the tracking characteristic of the head support mechanism of FIGS. 21A and 21B with respect to a target track of the head. FIG. 24A shows gain characteristics, and FIG. 24B shows phase characteristics.

In FIGS. 24A and 24B, reference numerals J1 through J5 each indicate a resonance point when the thin film piezoelectric elements 11A and 11B in the head support mechanism of FIGS. 21A and 21B are driven; J1 indicates a resonance point in a twist first-order mode of the beam portion 4C of the load beam 4 shown in FIG. 23A. J2 indicates a resonance point in a twist second-order mode of the beam portion 4C of the load beam 4 shown in FIG. 23B. J3 indicates a resonance point in a plane vibration mode (Sway) of the beam portion 4C of the load beam 4 shown in FIG. 23C. J4 and J5 each indicate a resonance point in a resonance mode of the transformation operation portions 8D and 8E of the thin film piezoelectric substrate 8.

From the view point or the dynamic characteristics of the head support mechanism, the frequencies in those resonance modes are preferably increased up to a sufficient frequency region such that the frequencies do not affect the positioning of the head. Since the resonance points J1 through J3 are characteristics which result from the structure of the load beam 4, there is necessarily a limit to the resonance frequency, so that the resonance frequency cannot be greatly increased. Therefore, it is necessary to reduce the phase delay of responses of the resonance points J1 through J3.

Figure 22B:
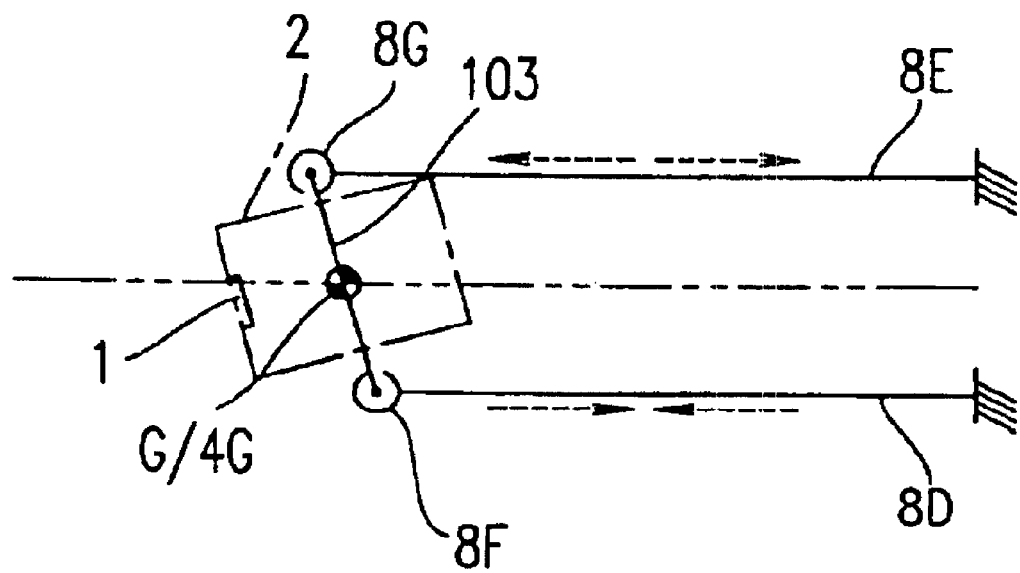
Figure 23A:
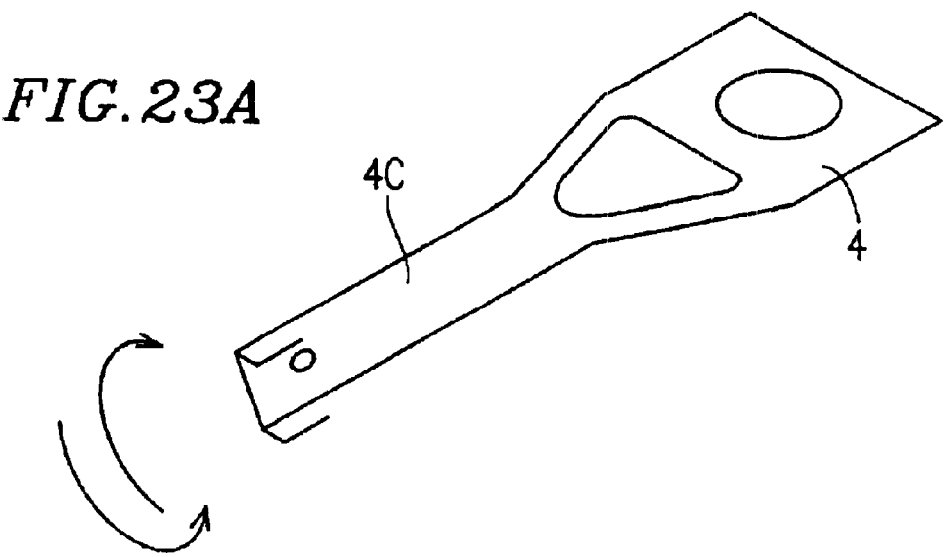
FIGS. 23A through 23C are perspective views illustrating vibration modes of a load beam of Example 2.
Figure 23B:
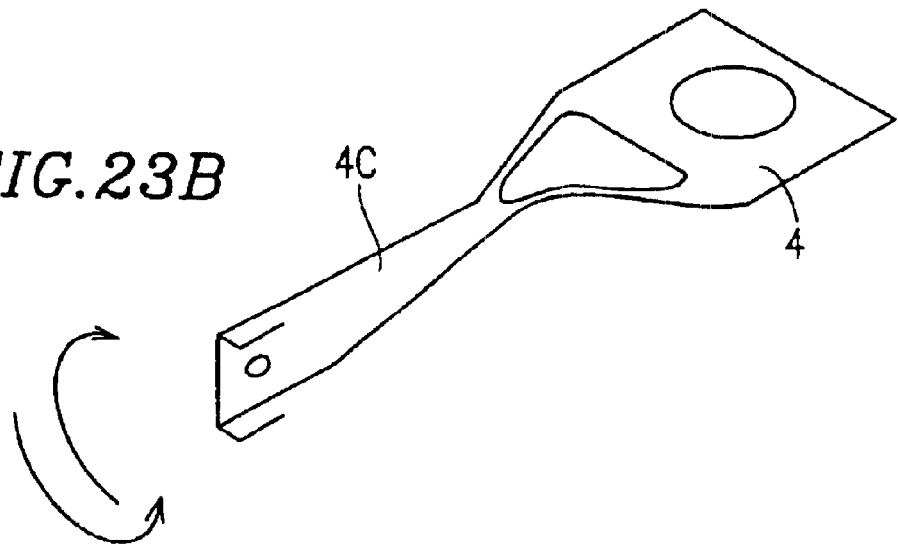
Figure 23C:
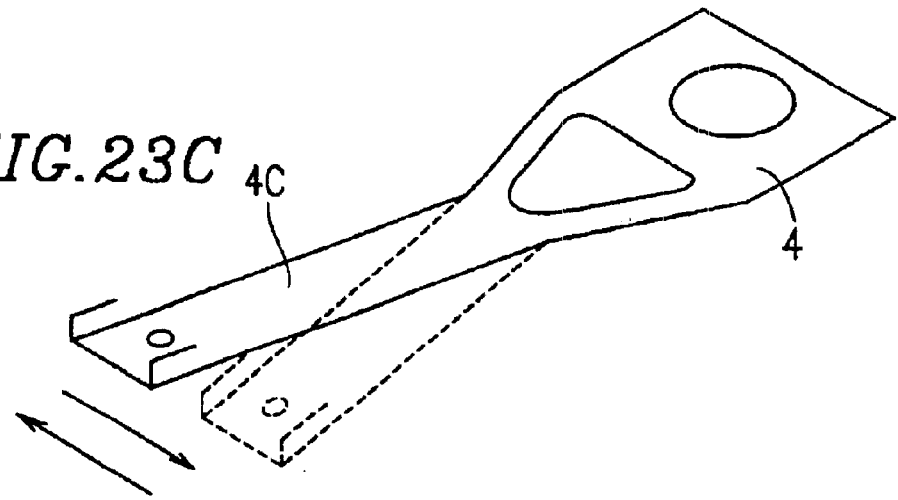

FIGS. 22A and 22B are diagrams illustrating the head support mechanism 200 of Example 2 in which the position of the center of gravity G of the small rotation portion including the slider 2 and the slider holding plate 103 substantially corresponds to the position of the dimple 4G. As shown in FIG. 22A, since the position of the center G of gravity substantially corresponds to the position of the dimple 4G, a reaction force Rb due to an angular moment Mb is not generated. Therefore, as shown in FIG. 22A, the displacement amounts of the transformation operation portions 8D and 8E are converted to rotation in the yaw direction of the slider 2. The resultant response characteristics are shown in FIGS. 25A and 25B. FIG. 25A shows gain characteristics, and FIG. 25B shows phase characteristics.

As shown in FIGS. 25A and 25B, since the position of the center of gravity G or the small rotation portion including the slider 2 and the slider holding plate 103 substantially corresponds to the position of the dimple 4G, an amplitude characteristic and a phase characteristic of resonance at a twist second-order mode resonance point J2 can be improved and a parallel vibration resonance point J3 is substantially not present.

As described above, in the head support mechanism 200 of the present invention, the position of the center of gravity G of the small rotation portion including the slider 2 and the slider holding plate 103 substantially corresponds to the position of the dimple 4G. Therefore, the head support mechanism 200 of the present invention can achieve an excellent response characteristic when the thin film piezoelectric elements 11A and 11B are driven at a high frequency.

Further, the slider 2 and the slider holding plate 103 are supported on the dimple 4G so as to rotate not only in the yaw direction but also in all other directions. Therefore, a friction loss of the slider holding plate 103 upon rotation can be greatly reduced, thereby making it possible to produce a great amount of displacement of the head 1 with a small driving force.

Further, the center position M1 of the air bearing surface 2E substantially corresponds to the center of rotation of the slider 2. Therefore, the head 1 on the slider 2 in not likely to be disturbed by a frictional force due to the viscosity of air, for example.

Figure 18:
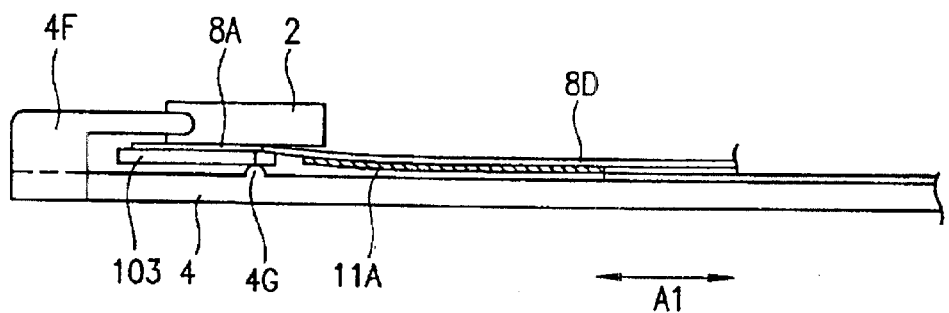
FIG. 18 is a side view of a major part of the head support mechanism of Example 2, used for explaining operation thereof.

Furthermore, the beam structure composed of the thin film piezoelectric substrate 8 an the thin film piezoelectric elements 11A and 11B has a high level of rigidly in at direction indicated by arrow A1 in FIG. 18. Therefore, the vibrational resonance point of the head support mechanism 200 can to structurally improved.

Figure 26A:
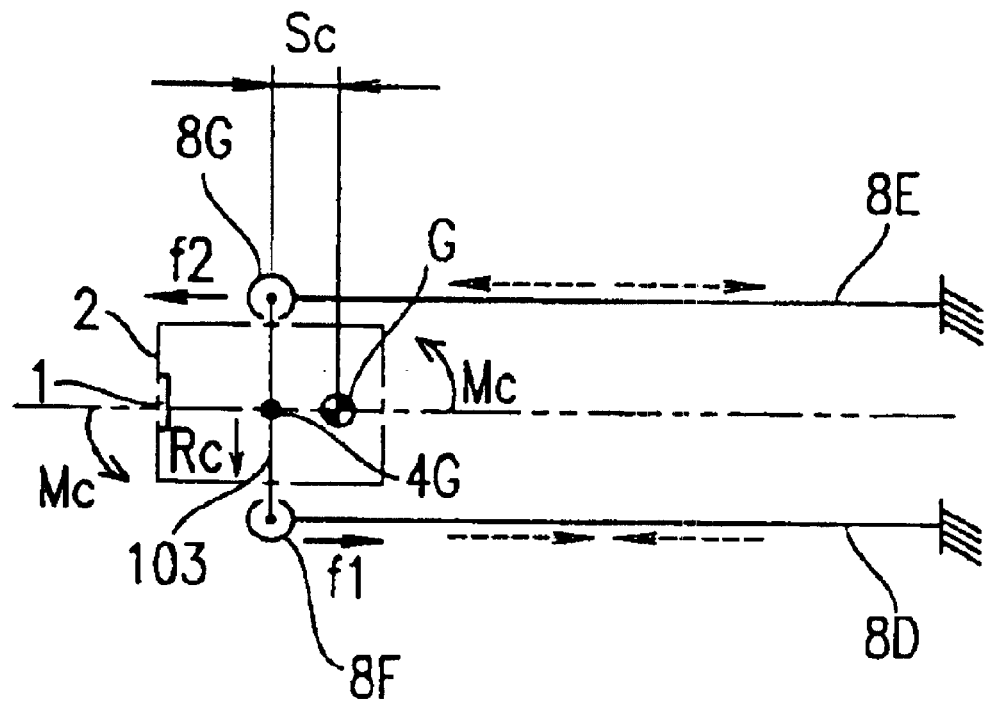
FIGS. 26A and 26B are schematic diagrams used for explaining the operation of the head support mechanism as a variation of Example 2.

FIGS. 26A and 26D are schematic diagrams illustrating a model of another head support mechanism according to Example 2 of the present invention. The basic structure of the head support mechanism is the same as that of the above-described lead support mechanism 200 of Example 2. Thus, the components of the another head support mechanism are not herein described.

The another head support mechanism of Example 2 is characterized as shown in FIG. 26A in that the dimple 4G is positioned between the head 1 and the center of gravity G of the small rotation portion including slider 2 and the slider holding plate 103 where the small rotation portion rotates on the dimple 4G.

Voltages having opposite phases are applied to the respective thin film piezoelectric elements 11A and 11B so that the head 1 is displaced by a small amount toward a position of a target track. In this case, the transformation operation portion 8D of the thin film piezoelectric substrate 8 is contracted while the transformation operation portion 8E thereof is expanded, thereby generating forces F1 and F2 which act the elastic hinge portions 8G and 8F in the directions shown in FIG. 26A.

In this case, the transformation operation portions 8D and 8E can be displaced in the contraction and expansion directions. However, the slider holding plate 103 is restrained in the bend air direction of the transformation operation portion 8D and 8E due to frictional force. As a result, an angular moment Mo around the center of gravity G is generated by the forces F1 and F2, which acts on the slider 2 and the slider holding plate 3. There is a distance So between the center G of gravity and the dimple 4G, so that a reaction force Rc(=Mc/Sc) is generated to act the dimple 4G.

The reaction force Rc leads to transformation of the beam 4C of the load beam 4. However, as is different from the case of FIGS. 21A and 21B, the reaction force Rc acts on the head 1 in the desired direction of displacement, thereby promoting the movement of the head 1 due to the rotation of the slider 2. This situation is shown in FIG. 26B.

Since the slider 2 and the slider holding plate 3 each have a mass, the slider 2 and the slider holding plate 3 exhibit a characteristic in which a phase leads an input signal instructing the movement of the head 1.

Figure 26B:
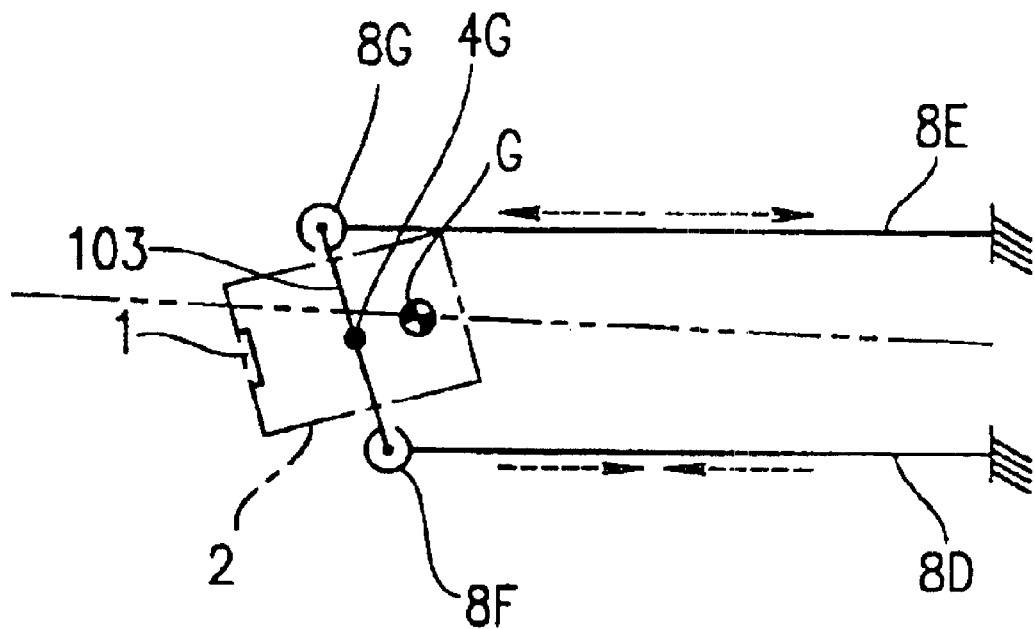
Figure 27A:
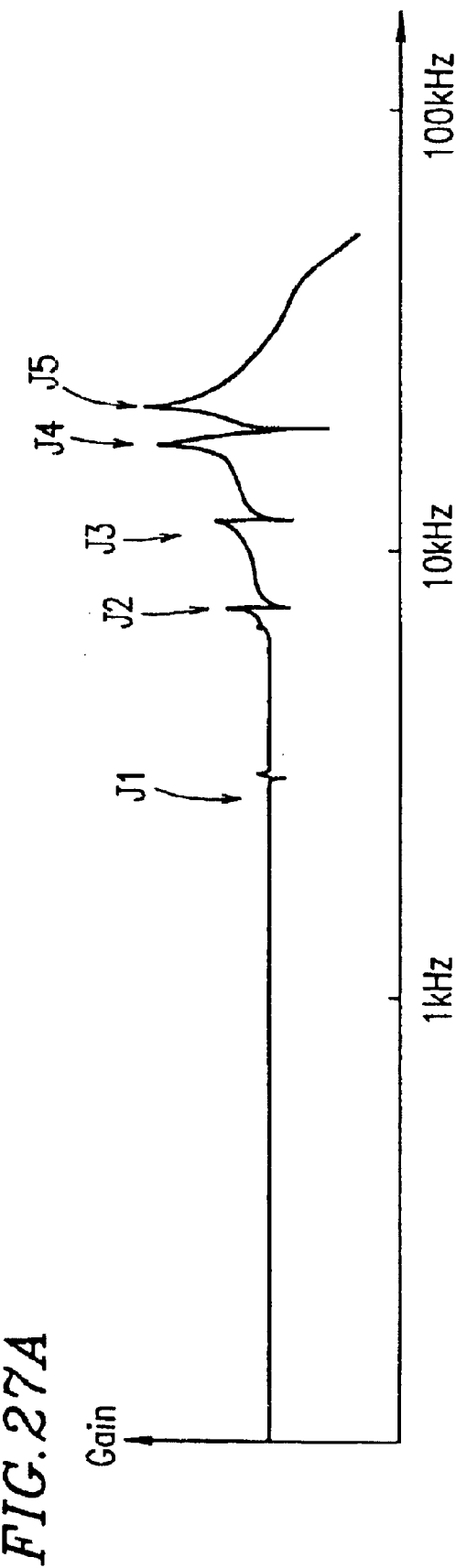
FIGS. 27A and 27B are graphs showing response characteristics of the head support mechanism of FIGS. 26A and 26B.
Figure 27B:
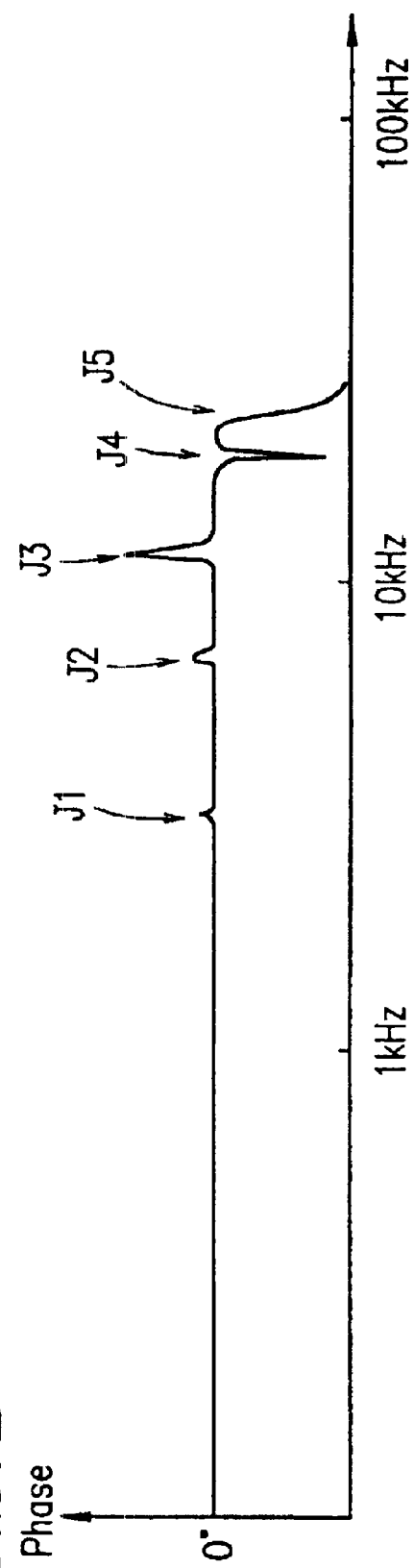

FIGS. 27A and 27B are graphs showing tracking characteristics of the head support mechanism of FIGS. 26A and 26B with respect to a target track of the head. FIG. 27A shows gain characteristics, and FIG. 27B shows phase characteristics.

In FIGS. 27A and 27B, reference numerals J1 through J5 each indicate a resonance point when the thin film piezoelectric elements 11A and 11B in the head support mechanism of FIGS. 26A and 26B are driven. J1 indicates a resonance point in a twist first-order mode of the beam portion 4C of the load beam 4 shown in FIG. 23A. J2 indicates a resonance point in a twist second-order mode of the beam portion 4C of the load beam 4 shown in FIG. 23B. J3 indicates a resonance point in a plane vibration mode (Sway) of the beam portion 4C of the load beam 4 shown in FIG. 23C. J4 and J5 each indicate a resonance point in a resonance mode of the transformation operation portions 8D and 8E of the thin film piezoelectric substrate 8.

The phase characteristics of the resonance points J2 and J3 in FIGS. 27A and 27B each exhibit a leading phase, which is advantageous to the stability of the control. Further, if the peak values of the gain characteristics of the resonance points J2 and J3 are attenuated by a damper or the like (not shown), more satisfactory control characteristics can be obtained.

In the another head support mechanism of Example 2, the dimple 4G is positioned between the head 1 and the center of gravity G of the small rotation portion including slider 2 and the slider holding portion 103 where the small rotation portion rotates on the dimple 4G. Therefore, when a thin film piezoelectric element is driven at a high frequency, an excellent response characteristic is obtained in operation. Further, a stable control characteristic can be achieved in spite of variations in the position of the center of gravity.

EXAMPLE 3

FIG. 28 is a perspective view illustrating a head support mechanism 300 for use in a disk apparatus according to Example 3 of the present invention, viewed from a disk side. FIG. 29 is an exploded, perspective view illustrating the head support mechanism 300. Components similar to the corresponding, components described in Example 1 are designated by the same reference numerals as used in Example 1. The description of such components is therefore omitted.

Referring to FIGS. 28 and 29, the head support mechanism 300 has a load beam 4, on a tip portion of which a slider 2 attached to a head 1 is supported. The load beam 4 includes a square-shaped base portion 4A which is fixed by beam welding to a base plate 5. The base portion 4A and the base plate 5 are attached to a head actuator arm (not shown). The load beam 4 includes a neck portion 4B tapering from the base portion 4A, and a beam portion 4C extending straight from the neck portion 43. An opening portion 4D is provided in the middle of the neck portion 4B. In the neck portion 4B, portions on the opposite sides of the opening portion 4D each function as a plate spring portion 4E.

Figure 30:
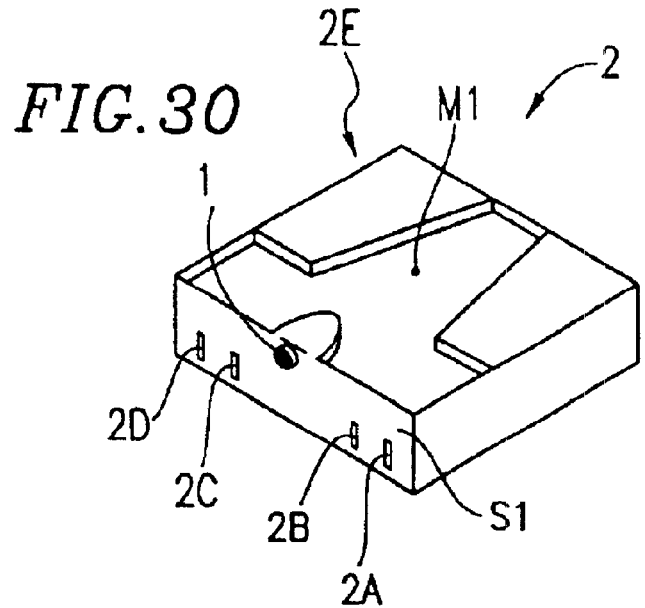
FIG. 30 is a perspective view illustrating a slider for use in the head support mechanism of Example 3.

As shown in FIG. 30, a head 1 including an MR element is provided in a side of the slider 2. Further, four terminals 2A through 2D are disposed in a transverse direction in the lower portion of the side of the slider 2. Furthermore, an air bearing surface 2E is provided on an upper side of the slider 2. An air flow generated by a rotating magnetic disk is passed in a pitch direction of the slider 2 (a tangential direction of a magnetic disk) so that an air lubricating film is generated between the air bearing surface 2E and a magnetic disk.

As shown in FIG. 29, a flexure 307 having a head conductor pattern 306 is provided on the beam portion 4C of the load beam 4. A base material of the flexure 307 is stainless steel. The slider 2 carrying the head 1 is placed on a slider attachment portion 307X of the flexure 307.

Figure 31:
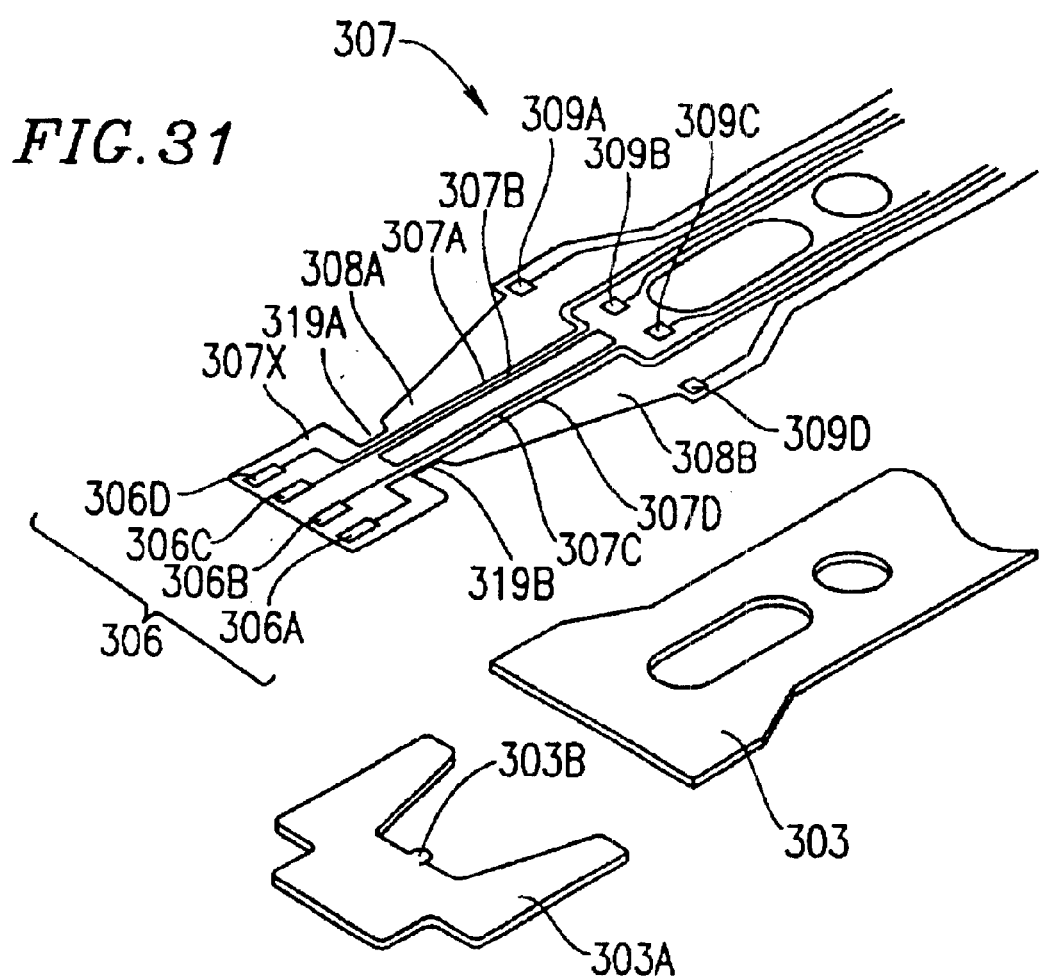
FIG. 31 is a diagram illustrating a structure of a flexure for use in the head support mechanism of Example 3.

As shown in FIG. 31, patterned conductors 306A, 306B, 306C and 306D are provided on the flexure 307. A slider holding plate 303A is attached to a side opposite to the slider 2 of the slider attachment portion 307X. The outside shape of the slider holding plate 303A is formed along with the flexure substrate 303 by etching. Further, a projection portion 303B is provided in the slider holding plate 303A. The projection portion 303B contacts a dimple 4G which is provided in the vicinity of the tip portion of the load beam 4 of FIG. 29. The projection portion 303B is pressed by the dimple 4G so that the slider holding plate 303A can be rotated on the dimple 4G in all directions.

The slider 2 of FIG. 30 is attached to the slider holding plate 303A in such a manner that the center position M1 of the air bearing surface 2E substantially corresponds to the dimple 4G of the load beam 4 of FIG. 29. An externally connected terminal holding portion 307Y is provided on the other end of the flexure 307 a shown in FIG. 29. The externally connected terminal holding portion 307Y is disposed at an edge of the base portion 4A of the load beam 4.

As shown in FIG. 29, a pair of regulation portions 4F are provided on the tip portion of the beam portion 4C. There is an appropriate gap between the regulation portions 47 and the slider holding plate 303A so that the slider holding plate 303A can be rotated. Each regulation portion 4F extends straight from the tip portion of the beam portion 4C toward the base portion 4A.

Figure 32:
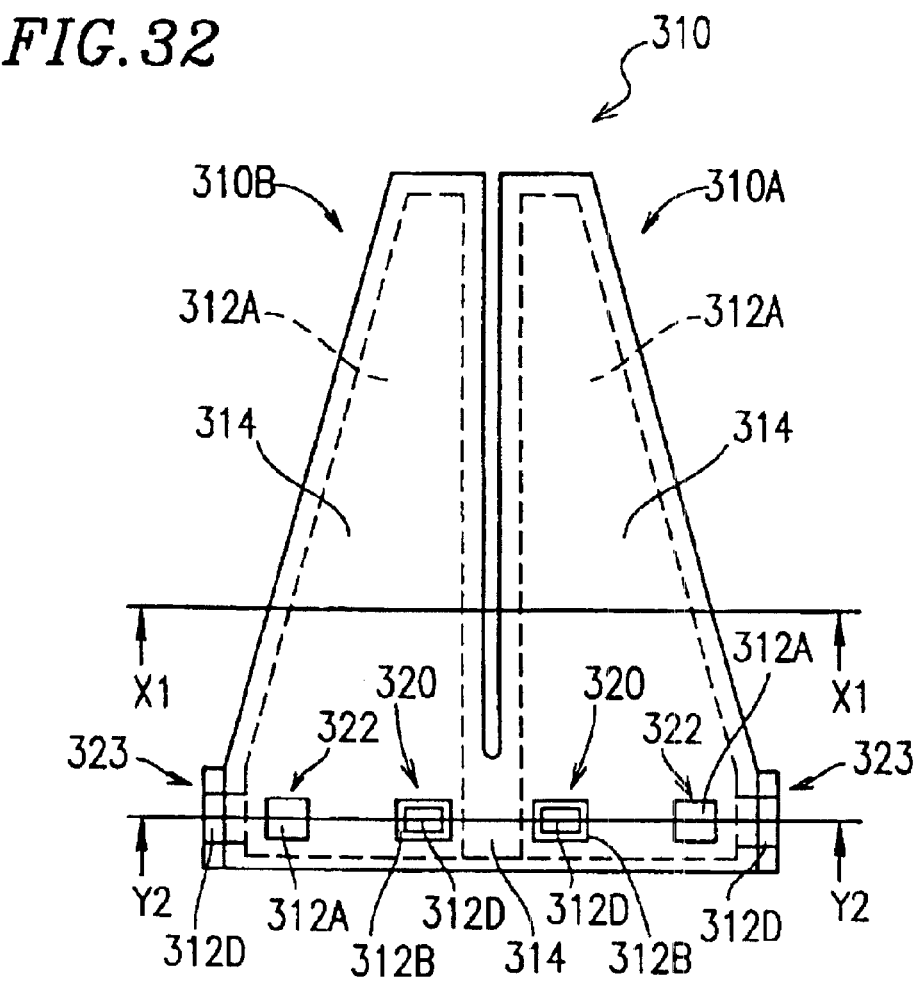
FIG. 32 is a top view illustrating a thin film piezoelectric element of Example 3.
Figure 33:
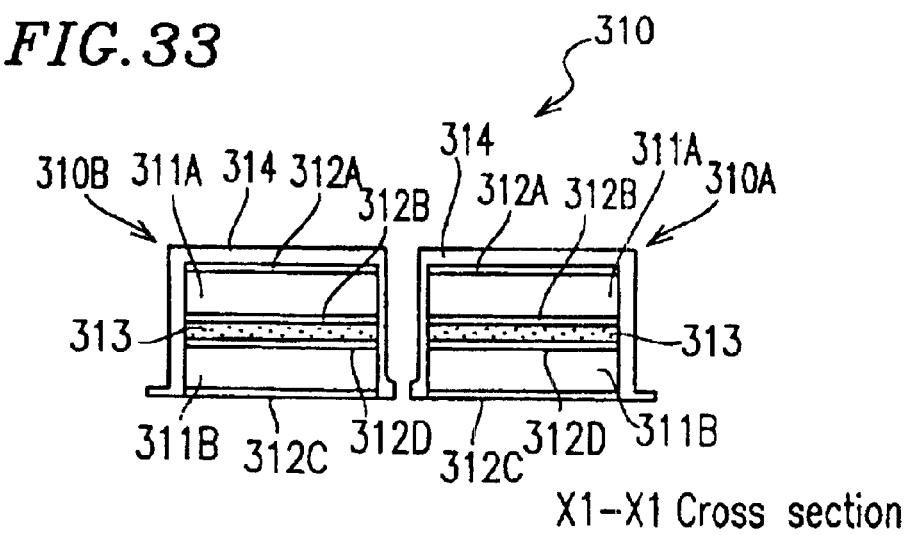
FIG. 33 in a cross-sectional view of FIG. 32 taken along line X1—X1.

A thin film piezoelectric element 310 in Example 3 is attached to thin film piezoelectric holding portions 308A and 308B of the flexure 307 (FIGS. 29 and 31). FIG. 32 to a top view of the thin film piezoelectric element 310. The thin film piezoelectric element 310 includes a pair of elements 310A and 310B which are separated from each other. FIG. 33 is a cross-sectional view of the thin film piezoelectric element 310. The thin film piezoelectric element 310 has two layers, i.e., first and second thin film piezoelectric elements 311A and 311B. First and second metal electrode films 312A and 312B are provided on upper and lower sides of the first thin film piezoelectric element 311A, respectively. The first thin film piezoelectric element 311A is provided above the second thin film piezoelectric element 311B. Similarly, third and fourth metal electrode films 312C and 312D are provided on upper and lower sides of the second thin film piezoelectric element 311B, respectively. The second metal electrode film 312B and the fourth metal electrode film 312D are electrically shorted by a conductive adhesive 313. The entire thin film piezoelectric element 310 is covered with flexible coating resin 314. The coating resin 314 combines the thin film piezoelectric element 310A with the thin film piezoelectric element 310B.

Figure 34:
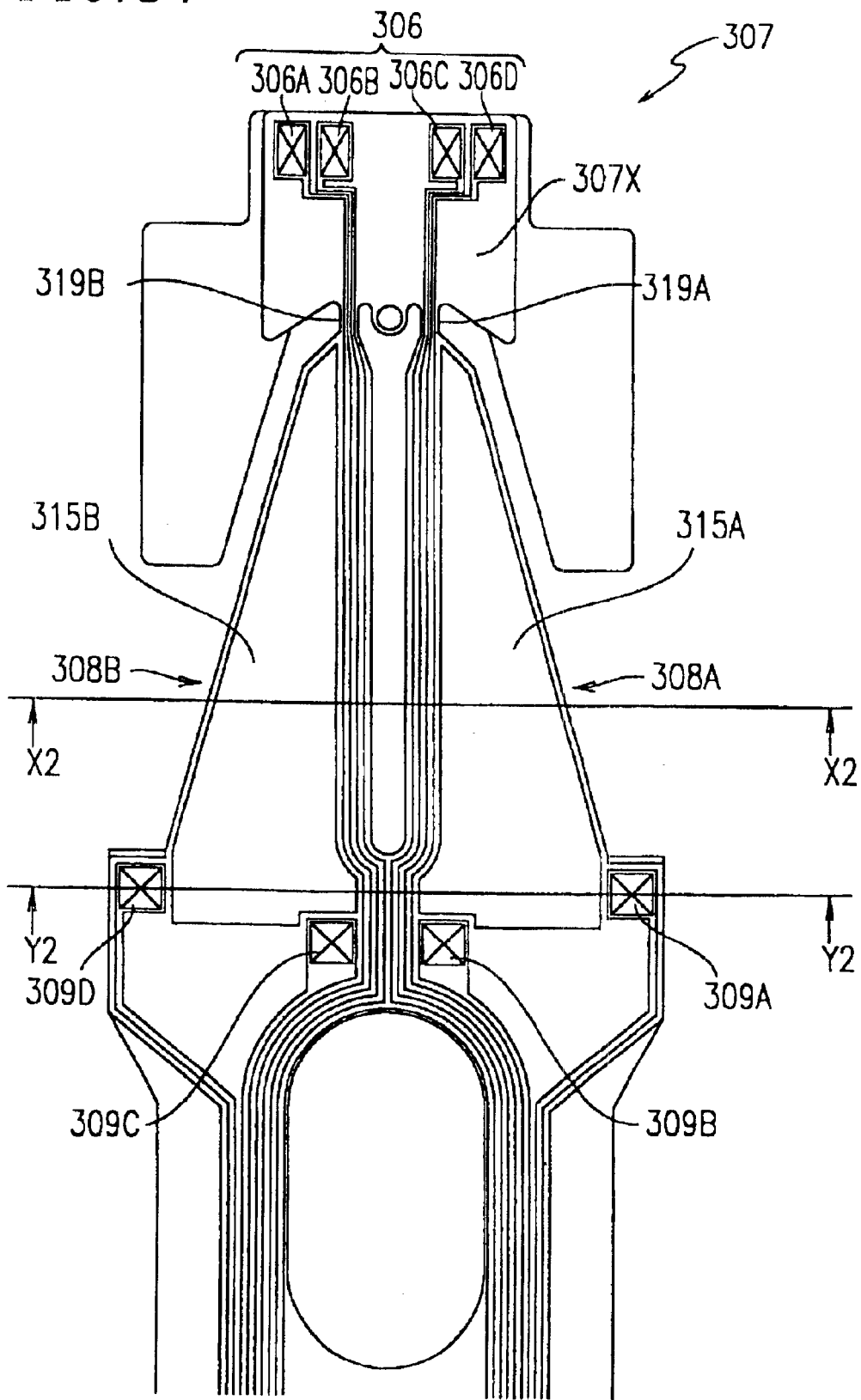
FIG. 34 is a top view illustrating the flexure for use in the head support mechanism of Example 3.
Figure 35:
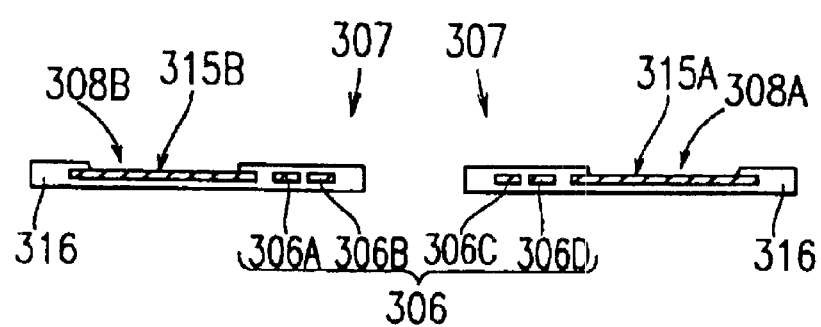
FIG. 35 is a cross-sectional view of FIG. 34 taken along line X2—X2.
Figure 36:
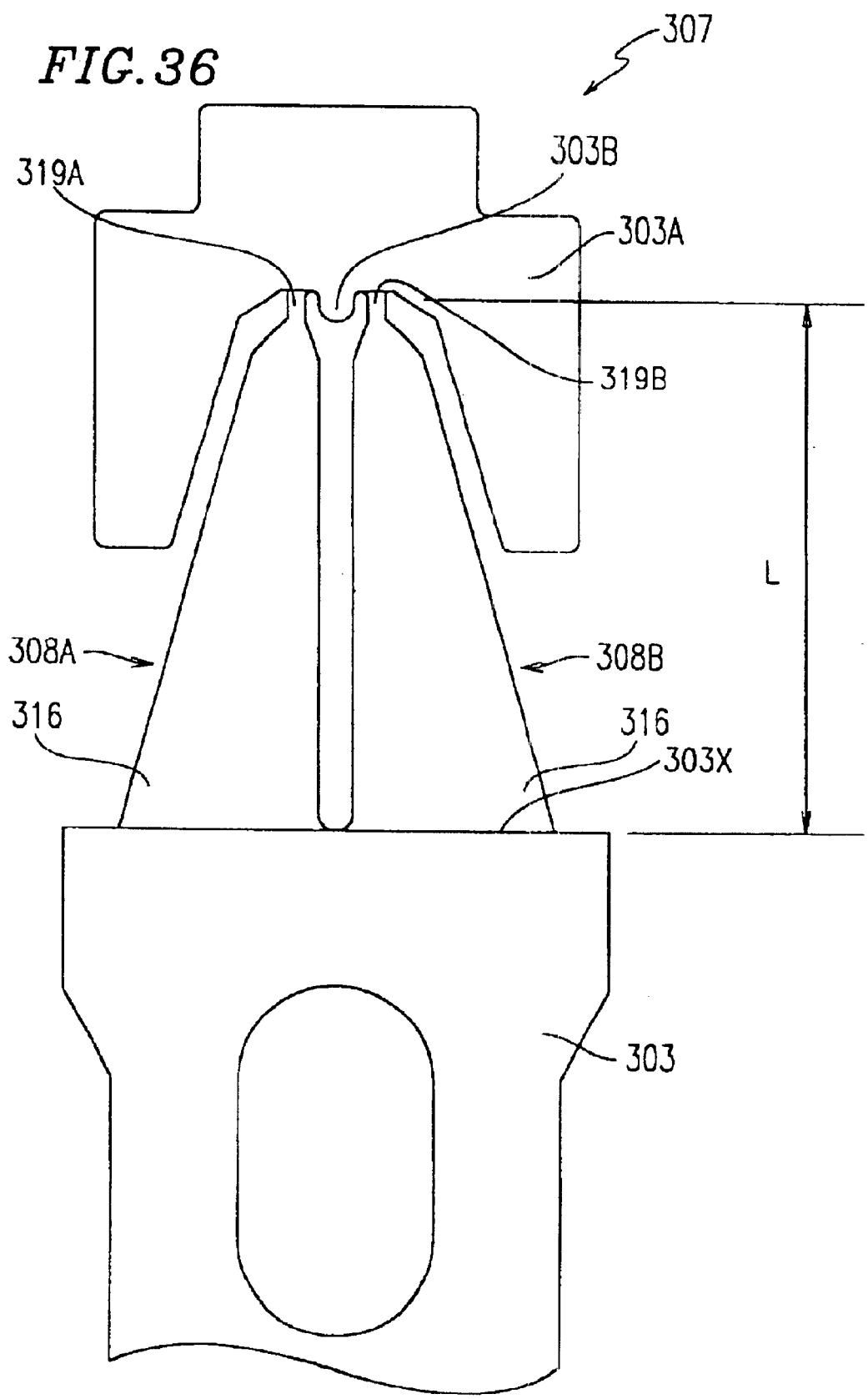
FIG. 36 is a bottom view illustrating the flexure for use in the head support mechanism of Examples 3.

FIG. 34 is a top view of the flexure 307. FIG. 35 is a cross-sectional view of the thin film piezoelectric element holding portion 308A and 308B of the flexure 307, taken along line X2—X2 shown in FIG. 34. Substrates 315A and 315B in the respective thin film piezoelectric element holding portions 308A and 308B are formed at the same line when a conductor 306 is formed and patterned by etching or the like, so that the material and thickness of the substrates 315A and 315B are substantially identical to those of the conductor 306, and the substrates 315A and 315B and the conductor 306 are provided on the same plane. The substrates 315A and 315B and the conductor 306 are covered with an insulating material 316 such an polyimide resin. A side of the substrates 315A and 315B are exposed, to which side the thin film piezoelectric element 310 is attached, so that the adhesive strength between the thin film piezoelectric element 310 and the substrates 315A and 315B is secured. FIG. 36 is a bottom view of the flexure 307, as is different from FIG. 34.

Figure 37:
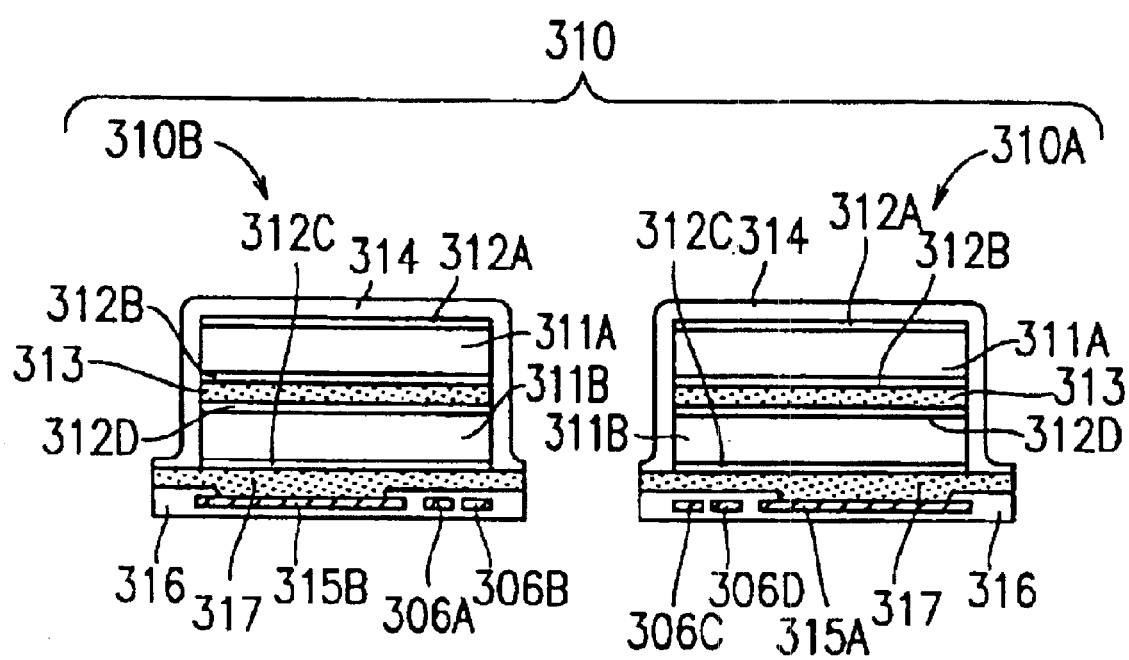
FIG. 37 in a cross-sectional view of FIG. 34 taken along line Y2—Y2 where the thin film piezoelectric element is attached to the flexure.

FIG. 37 is a cross-sectional view illustrating the thin film piezoelectric element holding portions 308A and 308B attached to the thin film piezoelectric element 310 using an adhesive 317. An shown in FIG. 37, the thin film piezoelectric element holding portions 310A and 310B each include a two layer structure composed of the first and second thin film piezoelectric elements 311A and 311B.

Figure 38A:
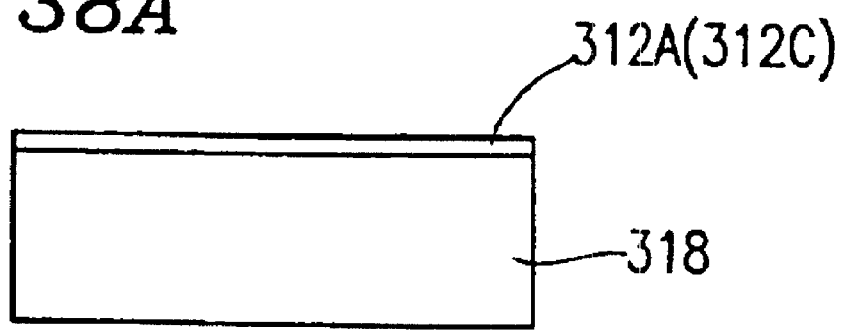
Figure 38B:
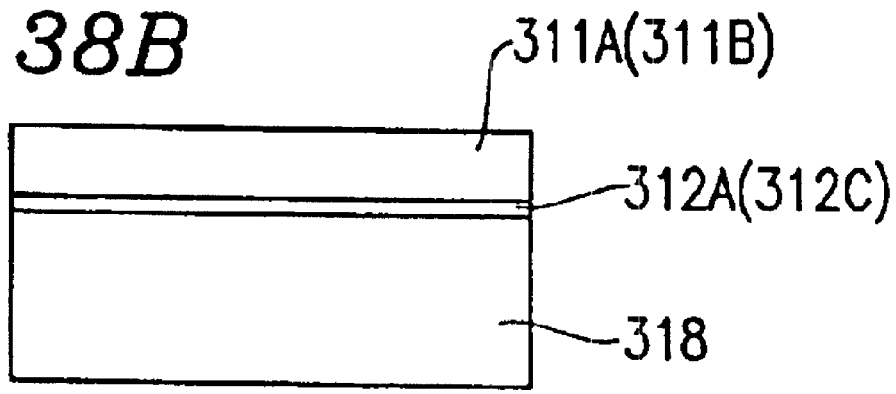
Figure 38C:
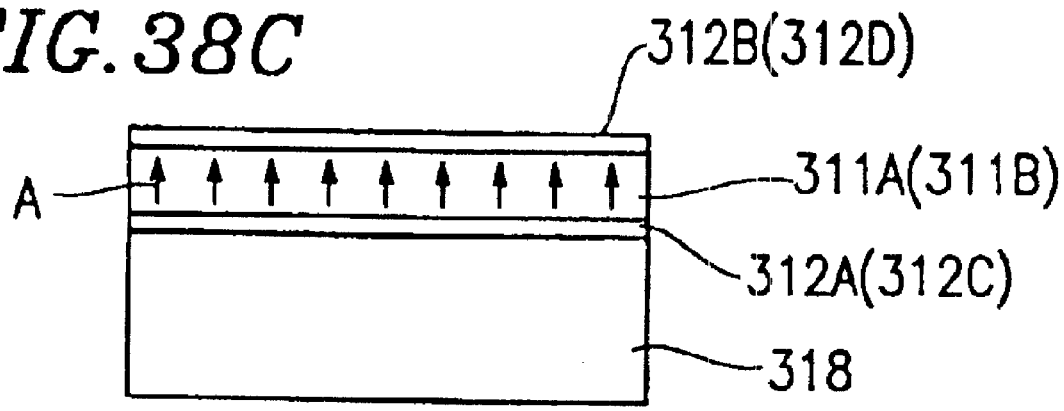

As shown in FIG. 38A, the metal electrode film 312A (312C) is provided on a mono-crystal substrate 318 having a lattice constant close to that of the first and second thin film piezoelectric elements 311A and 311B. As shown in FIG. 38B, the first thin film piezoelectric element 311A (311B), which is made of PZT or the like, is provided on the metal electrode film 312A (312C). Therefore, the thin film piezoelectric element 311A (311B) is mono-crystally grown on the metal electrode film 312A. As shown in FIG. 38C, the metal electrode film 312B (312D) is provided on the upper side of the thin film piezoelectric element 311A (311B). In this case, the polarization direction of the thin film piezoelectric element 311A (311B) is uniformly a direction indicated by arrows A in FIG. 38C, just after the formation of the film. The linear thermal expansion coefficient of the mono-crystal substrate 318 is higher than that of the thin film piezoelectric element 311A (311B).

Figure 39A:
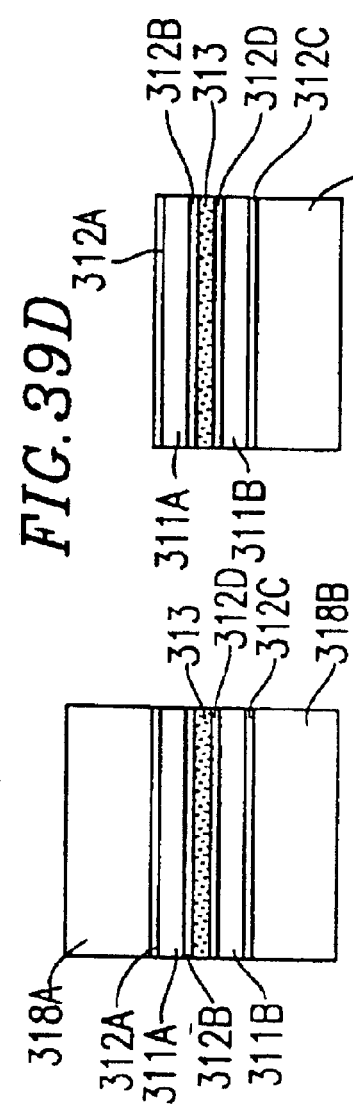
FIGS. 39A through 39G are diagrams showing a procedure for forming the thin film piezoelectric element of Example 3 having a two-layer structure on a mono-crystal substrate.
Figure 39B:
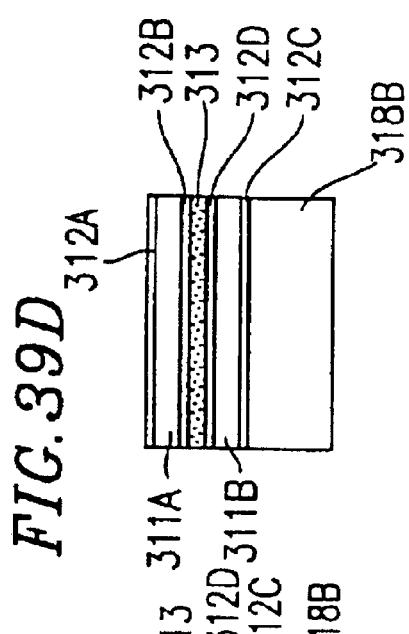
Figure 39C:
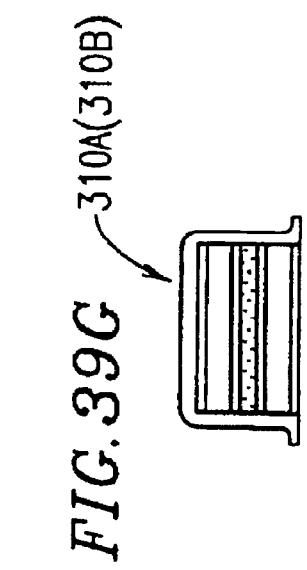
Figure 39D:
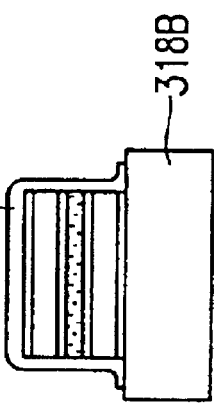
Figure 39E:
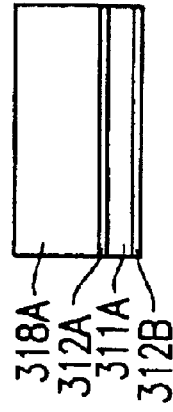
Figure 39F:
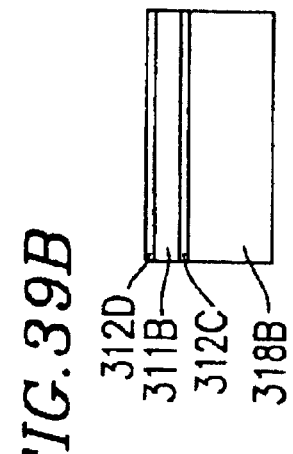
Figure 39G:
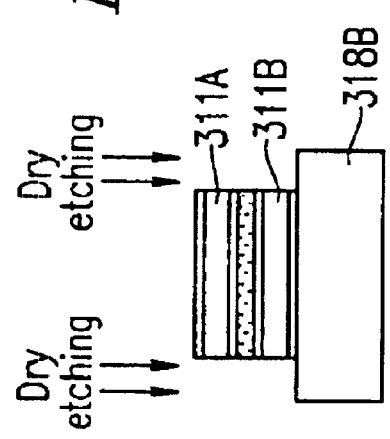
Figure 40:
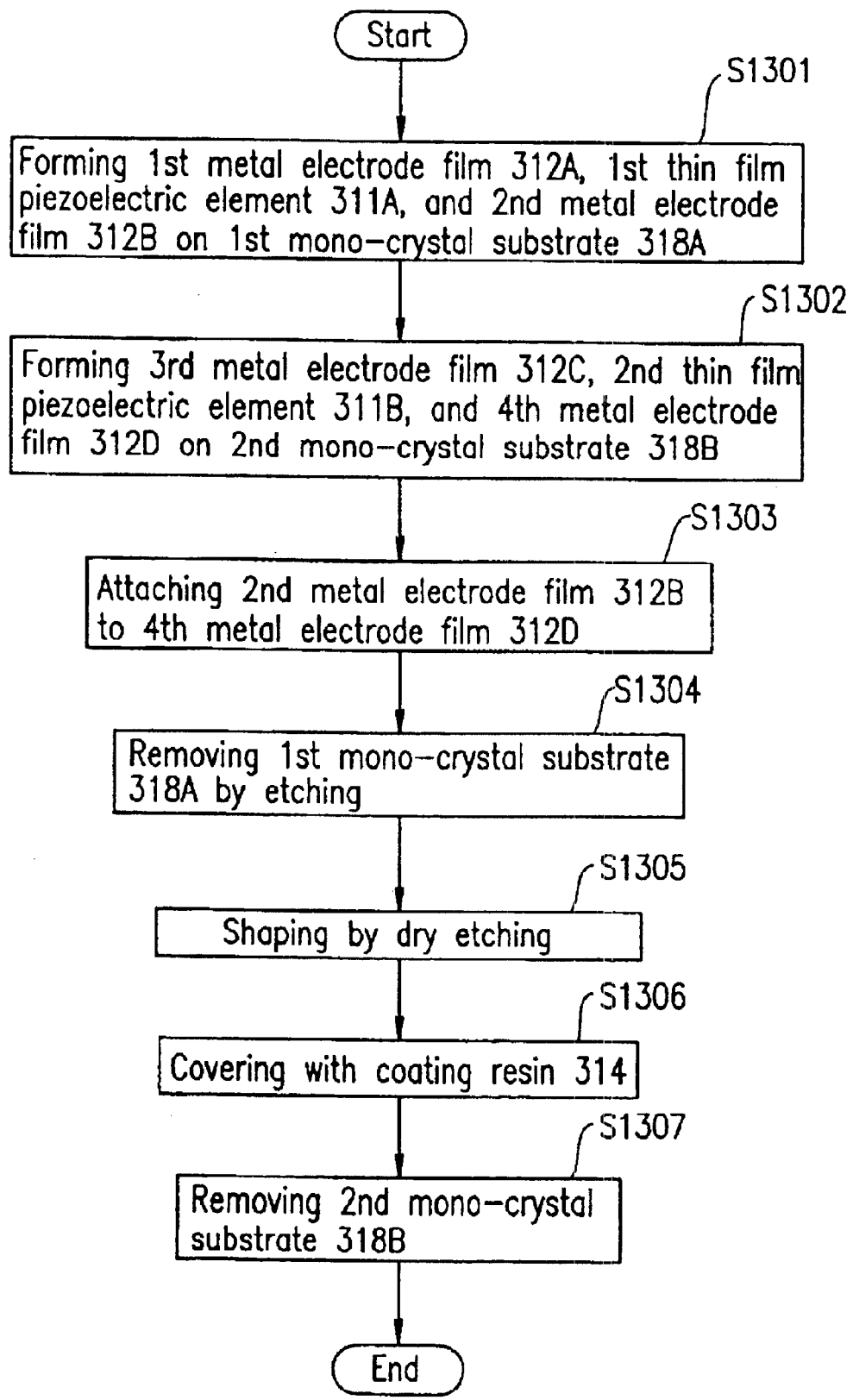
FIG. 40 is a flowchart showing a method for producing the thin film piezoelectric element of Example 3.

Referring to FIGS. 39A through 39G and FIG. 40, a method for producing the two layer structure will be described. FIGS. 39A through 39G show a procedure for producing a two-layer structure of thin film piezoelectric element formed on a mono-crystal substrate. FIG. 40 is a flowchart showing a method for producing the thin film piezoelectric element of Example 3. As shown in FIG. 39A, a first metal electrode film 312A, a first thin film piezoelectric element 311A, and a second metal electrode film 312D are formed on a first mono-crystal substrate 318A (FIG. 40: S1301). As shown in FIG. 39B, a third metal electrode film 312C, a second thin film piezoelectric element 311B, and a fourth metal electrode film 312D are formed on a second mono-crystal substrate 318B (FIG. 40: S1302), As shown in FIG. 39C, the second metal electrode film 312B (FIG. 39A) and the fourth metal electrode film 312D (FIG. 39B) are adhered to each other using the conductive adhesive 313 (FIG. 40: S1303). As shown in FIG. 39D, the first mono-crystal substrate 318A of the mono-crystal substrate 318 is removed by etching (FIG. 40: S1304). As shown in FIG. 39E, the two-layer structure of the thin film piezoelectric elements 311A and 311B are dry-etched to be in the form of the thin film piezoelectric element 310 (FIG. 40: S1305). As shown in FIG. 39F, a surface of the second mono-crystal substrate 318B on which the thin film piezoelectric element 310 is formed is covered with the coating resin 314 so as to avoid corrosion of the thin film piezoelectric element 310 (FIG. 40: S1306). As shown in FIG. 39G, the still remaining second mono-crystal substrate 318B is removed by etching to obtain the thin film piezoelectric element 310A (310B) (FIG. 40: S1307). Note that the first metal electrode film 312B and the fourth metal electrode film 312D are adhered to each other using a thermal melting technique using ultrasonic vibration.

Wet etching or the like other than dry etching can be used as a shaping method in the present invention.

Referring to FIG. 29, one end of the thin film piezoelectric element terminal 309A, 309B, 309C, and 309D provided in a middle of the flexure 307 are connected to the externally connected terminal holding portion 307Y which is connected to an external driving circuit. Referring to FIG. 31, linkage portions 319A and 319D which link the respective thin film piezoelectric portions 308A and 308B in the flexure 307 with the slider attachment portion 307X, are elastic hinge portions.

Figure 41:
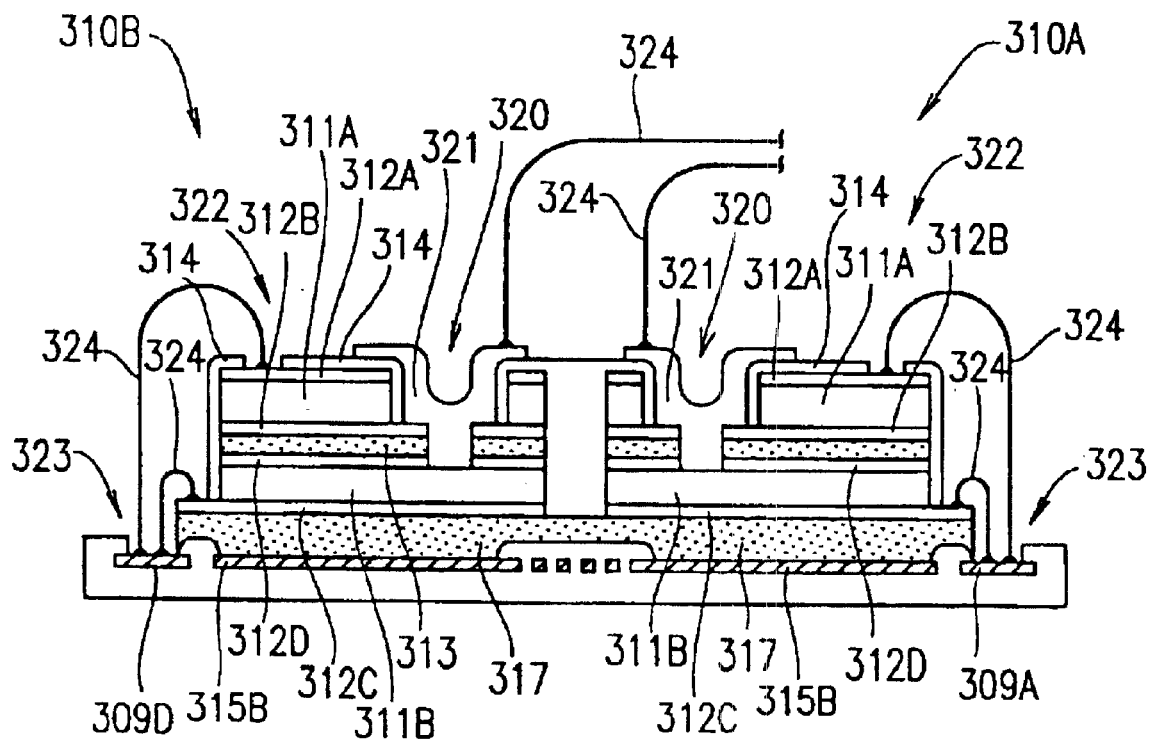
FIG. 41 is a cross-sectional view Illustrating an electrode connection portion of the thin film piezoelectric element of Example 3.

Referring to FIG. 41, formation of the electrodes in the thin film piezoelectric element 310 (310A wad 310B) will be described. A positive voltage is applied to the metal electrode films 312A and 312C. The metal electrode films 312B and 312D are grounded. FIG. 41 is a diagram illustrating junction of the thin film piezoelectric element 310 (310A and 310B) and the thin film piezoelectric terminal 309A and 309B at a position corresponding to the Y2—Y2 cross-section of FIGS. 32 and 34. A method for forming ground connection portions 320 in the thin film piezoelectric element 310 (310A and 310B) will be described. As shown in FIG. 41, the first metal electrode film 312A and the first thin film piezoelectric element 311A are etched (a first etching step) up to the upper surface of the second metal electrode film 312B. In the etched portion, the second metal electrode film 312B and the conductive adhesive 313 are removed by etching (second etching step). Thereafter, the first metal electrode film 312A in the ground connection portion 320 is covered with the coating resin 314. Finally, ground metal terminal films 321 for shorting the second metal electrode film 312B and the fourth metal electrode film 312D are formed as a ground electrode.

The ground metal terminal film 321 are connected via a bonding wire 324 to the respective thin film piezoelectric element terminals 309B and 309C (FIG. 34). In the first electrode connection portion 322 (FIGS. 32, and 41) part of the coating resin 314 is removed so as to expose the first metal electrode film 312A. Similarly, in the fourth electrode connection portion 323 (FIGS. 32 and 41), part of the coating resin 314 is removed so as to expose the first metal electrode film 312A. As shown in FIG. 41, the first metal electrode film 312A in the electrode connection portion 322 and the electrode connection portion 323 in the electrode connection portion 323 are connected via the bonding wire 324 to the thin film piezoelectric elements 309A and 309D, respectively.

Figure 42:
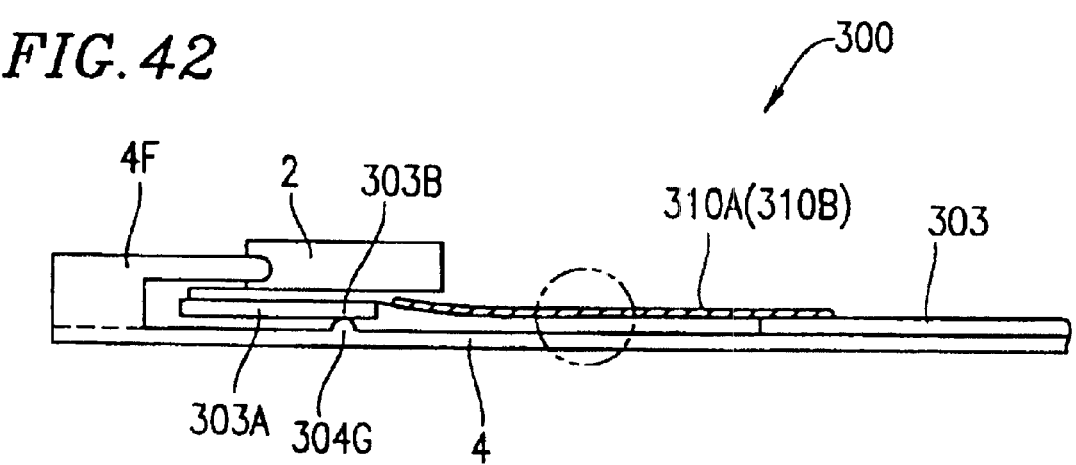
FIG. 42 is a side view of the head support mechanism of Example 3.
Figure 43A:
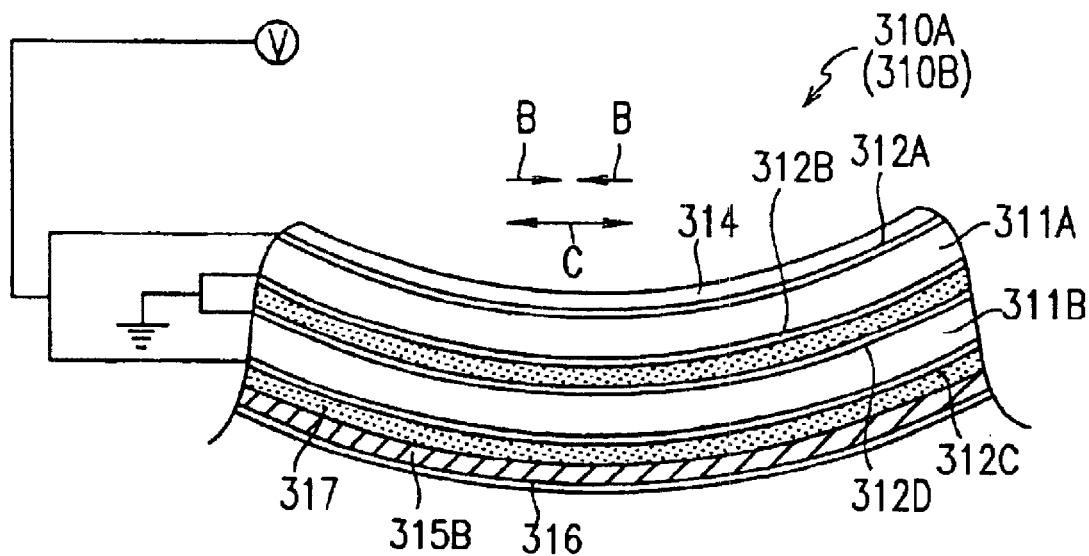
FIGS. 43A through 43C are diagrams including a cross-sectional view of the thin film piezoelectric device and graphs of applied voltage, used for explaining operation of the head support mechanism of Example 3.
Figure 43B:
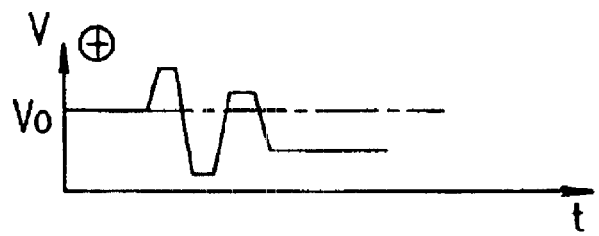
Figure 43C:
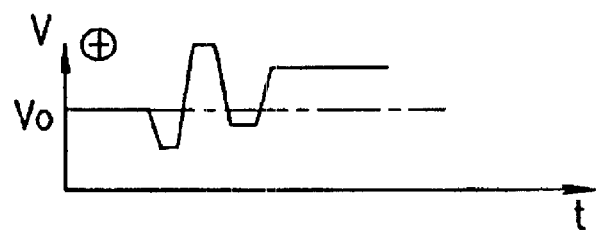
Figure 45:
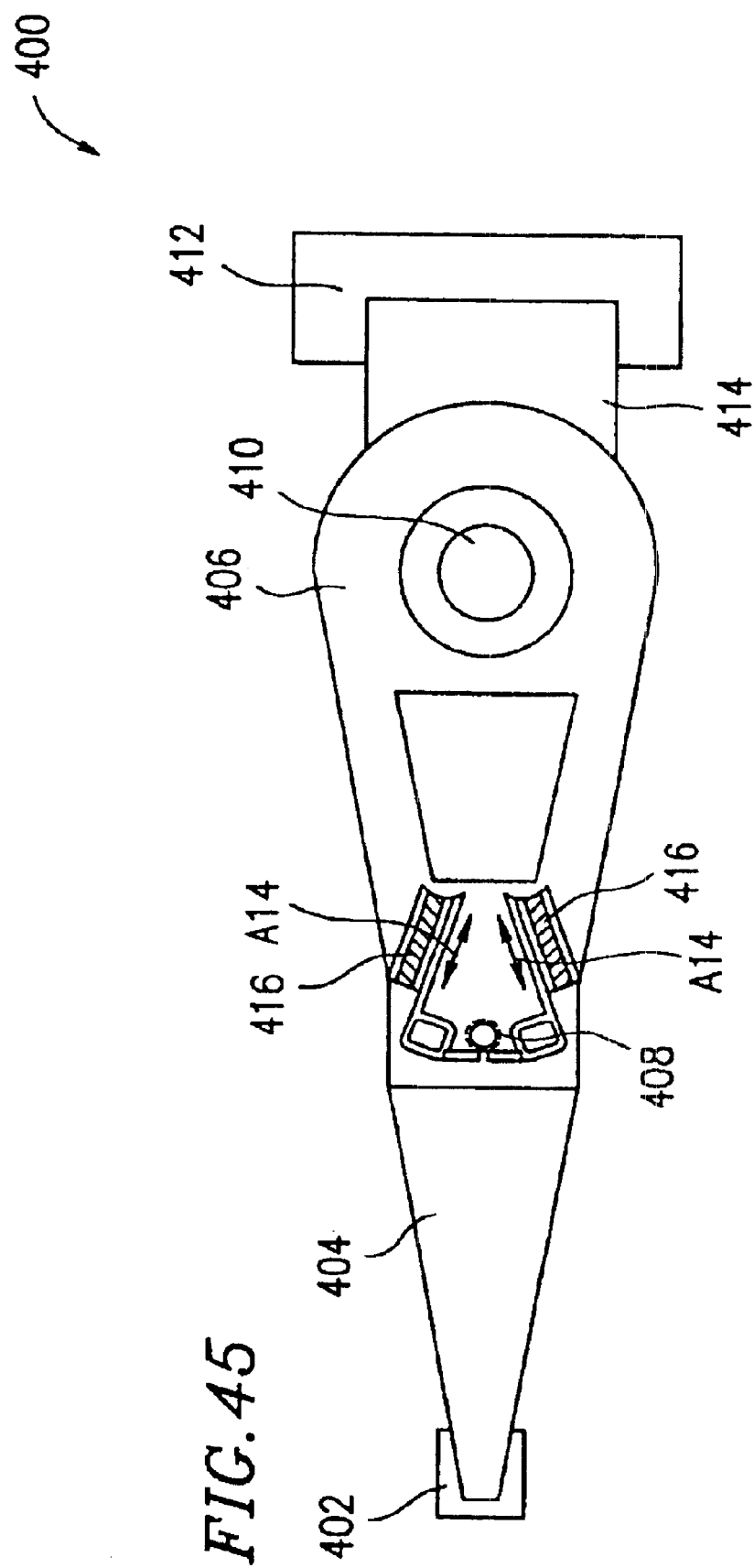
FIG. 45 is a top view illustrating an example of a conventional head support mechanism.

The head support mechanism 300 having the thus-constructed thin film piezoelectric element will be described will reference to FIGS. 42, 43A, 43B, 44A and 44B. FIG. 42 is a side view of the head support mechanism 300. FIG. 43A is an enlarged, cross-sectional view of the thin film piezoelectric element 318A (310B) of FIG. 42 shown in the dashed circle. The thin film piezoelectric element terminals 309B and 309C (FIG. 34) are grounded. Driving voltages are applied to the thin film piezoelectric element terminals 309A and 309D to drive the thin film piezoelectric elements 310A and 310B, respectively, as shown in FIGS. 43D and 43C. Driving voltages having opposite phases with reference to a bias voltage V0 are applied to the thin film piezoelectric element terminals 309A and 309D, respectively. Consistently-positive driving voltages are applied to the thin film piezoelectric elements 311A and 311B, respectively. As shown in FIG. 43A, the thin film piezoelectric elements 311A and 311B are contracted in a direction indicated by arrow B in the presence of applied voltage. In this cage, however, the thin film piezoelectric element 310A (310B) is bent due to the substrate 315B (315A).

The contraction and expansion of the thin film piezoelectric elements 311A and 311B cause the thin film piezoelectric element holding portion 308A (308B) to be contracted and expanded, thereby changing a distance L between a border portion 303X (FIG. 36) with the thin film piezoelectric element holding portion 38D of the flexure substrate 303 and the elastic hinge portion 319A and 319B of the flexure 307 (FIG. 36). At the same time, the bend of the thin film piezoelectric element holding portion 315 is changed, leading to a change in the curvature of the thin film piezoelectric element holding portion 308. Such a curvature change leads to a change in the distance L. Therefore, the change in the distance L and the curvature change are combined. A driving voltage is applied to the thin film piezoelectric elements 311A and 311B in a polarization direction A shown in FIG. 38C. Therefore, the polarization of the thin film piezoelectric elements 311A and 311B are not reversed, so that characteristics of the thin film piezoelectric elements 311A and 311B are not impaired.

FIG. 44A is a diagram illustrating rotation of the slider 2 when the thin film piezoelectric element 310A is expanded and the thin film piezoelectric element 310B is contracted. FIG. 44B is a schematic diagram of FIG. 44A. When the thin film piezoelectric element 310A is expanded in a direction indicated by arrows 3 and the thin film piezoelectric element 310B is contracted in a direction indicated by arrows D, the slider 2 and the slider holding plate 303A are rotated in a direction indicated by arrow C on the dimple 4G contacting the projection portion 303B. Therefore, the head 1 provided on the slider 2 is moved along a width direction of each track provided in the form of a concentric circle on a magnetic disk. Thereby, a high-precision on-track capability can be obtained.

A load on the elastic hinge portions 319A and 319B upon rotation of the slider holding plate 303A is reduced so that the slider attachment portion 303A can be reliably rotated, since the elastic hinge portions 319A and 319B each have a minimum width required for provision of the patterned conductors 306A, 306B, 306C and 306D (FIG. 31).

A load (20 to 30 mN) is applied to the slider 2 via the plate spring portion 4E (FIG. 29) of the load beam 4. When the slider holding plate 303A is rotated, such a load is applied between the dimple 4G and the slider holding plate 303A. Therefore, frictional force determined by a frictional coefficient between the slider holding plate 303A and the dimple 4G is applied to the slider holding plate 303A. Thereby, the frictional force prevents the slider holding plate 303A from being shifted from the dimple 4G, although the projection portion 303B of the slider holding plate 303A can be freely rotated on the dimple 4G.

Referring to FIG. 44B, a first beam 3161 consisting of the thin film piezoelectric element holding portion 308A and the thin film piezoelectric element 310A and a second beam 3162 consisting of the thin film piezoelectric element holding portion 308B and the thin film piezoelectric element 310B are linked to the slider holding plate 303A in such a manner that the slider holding plate 303A can be restrained by the dimple 4G and rotated on the dimple 4G. The head 1 is provided on the slider 2 a distance F from the dimple 4G.

The elastic hinge portions 319A and 319B are each sufficiently flexible such that the slider 2 can be rotated is in the roll direction and the pitch direction. Therefore, a rotating characteristic of the slider 2 with respect to a magnetic disk can be made satisfactory.

As described above, according to Example 3, a thin film piezoelectric actuator can ba achieved, in which a monocrystal piezoelectric element has a two-layer structure, whereby a great displacement can be obtained by a small level of voltage.

Further, the two-layer structure confers rigidity to the thin film piezoelectric element, thereby increasing the resonance frequency of the actuator. Therefore, the driving frequency can be increased, thereby making it possible to obtain a high level tracking characteristic.

An described above, in the head support mechanism of the present invention for use in a disk apparatus, the head can be moved by a small amount with great precision for the purpose of tracking correction and the like, and the head can be effectively moved by a small amount in response to an applied voltage.

Further, the head support mechanism of the present invention has a simple structure in which thin film piezoelectric elements are provided on a single side of a substrate, thereby reducing manufacturing coat by a great amount.

Furthermore, in the head support mechanism of the present invention, the center of gravity of the small rotation portion including the slider can be optimized, thereby greatly ameliorating a potential adverse resonance characteristic of the load beam.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk apparatus comprising:
a head for performing recording and/or reproduction of data to and from a disk, and
a head support mechanism including a slider having the head attached thereto, a slider holding plate for holding the slider, a pair of substrates each having a piezoelectric element attached thereto, a pair of elastic hinges for connecting the slider holding plate and the pair of substrates, and a dimple for supporting the slider holding plate such that the slider holding plate is rotated in a pitch direction, a roll direction, and a yaw direction;
wherein each of the piezoelectric elements is integrally formed of a first element provided with first and second electrodes on both planes of a first piezoelectric section, and a second element provided with third and fourth electrodes on both planes of a second piezoelectric section, with the second electrode and the fourth electrode being placed facing each other,
wherein a driving voltage is loaded on the first and the third electrodes, and a ground voltage is loaded on the second and the fourth electrodes to make contraction and/or expansion of each of the piezoelectric sections of the pair of piezoelectric elements, and
wherein the slider is rotated around the dimple in the yaw direction by contraction and/or expansion of at least one of the piezoelectric elements.

2. A disk apparatus according to claim 1, wherein the pair of piezoelectric elements are respectively loaded on driving voltages each having an opposite phase with each other.

3. A disk apparatus according to claim 1, wherein the dimple is provided in a tip portion of a load beam for supporting the slider holding plate.

4. A disk apparatus according to claim 3, wherein the load beam includes a pair of regulation portions for regulating the rotation of the slider holding plate.

5. A disk apparatus according to claim 1, wherein root portions of the pair of substrates are mounted on a substrate of metal type.

6. A disk apparatus according to claim 1, wherein the pair of substrates and the elastic hinges are formed of an identical material.

7. A disk apparatus according to claim 1, wherein a conductor pattern for transmitting a recording and/or reproduction signal to and from the head is uniformly molded with the substrate by resin.

8. A disk apparatus according to claim 1, wherein each of the piezoelectric elements is integrally formed of the first element and the second element through an adhesion agent or a thermal melting technique using ultrasonic vibration between the second electrode and the fourth electrode.

* * * * *